US009213462B2

(12) United States Patent
Gunderson et al.

(10) Patent No.: US 9,213,462 B2
(45) Date of Patent: Dec. 15, 2015

(54) UNIFIED COMMUNICATIONS APPLICATION FUNCTIONALITY IN CONDENSED VIEWS

(71) Applicant: Microsoft Corporation, Redmond, WA (US)

(72) Inventors: Nathan Gunderson, Seattle, WA (US); Phillip Garding, North Bend, WA (US); Zaoyang Gong, Redmond, WA (US); Kris Durgin, Seattle, WA (US); Punit Java, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 13/649,097

(22) Filed: Oct. 10, 2012

(65) Prior Publication Data

US 2014/0101572 A1 Apr. 10, 2014

(51) Int. Cl.
*G06F 3/00* (2006.01)
*G06F 3/0481* (2013.01)
*G06F 9/44* (2006.01)
*H04L 12/58* (2006.01)

(52) U.S. Cl.
CPC ............ *G06F 3/0481* (2013.01); *G06F 9/4443* (2013.01); *H04L 51/04* (2013.01); *H04L 51/36* (2013.01); *G06F 2203/04803* (2013.01)

(58) Field of Classification Search
None
See application file for complete search history.

(56) References Cited

U.S. PATENT DOCUMENTS

| 7,343,561 | B1* | 3/2008 | Stochosky et al. ............ 715/758 |
| 7,945,620 | B2 | 5/2011 | Bou-Ghannam |
| 8,001,126 | B2 | 8/2011 | Berry |
| 8,095,665 | B1 | 1/2012 | Bau |
| 2004/0056893 | A1* | 3/2004 | Canfield et al. .............. 345/753 |
| 2005/0235034 | A1* | 10/2005 | Chen et al. ................... 709/206 |
| 2006/0174207 | A1 | 8/2006 | Deshpande |
| 2007/0288560 | A1* | 12/2007 | Bou-Ghannam et al. ..... 709/204 |
| 2009/0157693 | A1* | 6/2009 | Palahnuk ........................ 707/10 |
| 2009/0216569 | A1* | 8/2009 | Bonev et al. ...................... 705/5 |
| 2009/0254616 | A1* | 10/2009 | Cheung et al. ................ 709/204 |
| 2012/0150970 | A1* | 6/2012 | Peterson et al. ............. 709/206 |
| 2014/0047027 | A1* | 2/2014 | Moyers ........................ 709/204 |

FOREIGN PATENT DOCUMENTS

EP 2407876 A2 1/2012

OTHER PUBLICATIONS

"Designing a Windows 8 Metro style App Starting from an Existing Windows Phone App", Retrieved at <<http://blogs.telerik.com/Files/W8-Design-Case-Study.pdf>>, Retrieval Date: Sep. 19, 2012, pp. 1-15.
"Guidelines for Snapped and Fill Views Windows Store Apps", Retrieved at <<http://msdn.microsoft.com/en-us/library/windows/apps/hh465371.aspx>>, Retrieval Date: Sep. 19, 2012, pp. 1-5.

(Continued)

*Primary Examiner* — Stephen Alvesteffer
*Assistant Examiner* — Hua Lu
(74) *Attorney, Agent, or Firm* — Tom Wong; Micky Minhas

(57) ABSTRACT

A unified communications application is described herein. The unified communications application is displayable in one of two views: a full view and a condensed view. When displayed in the condensed view, which consumes less than fifty percent of a display screen, the unified communications application is employable by a user thereof to participate in real-time conversations/meetings with contacts of the user.

20 Claims, 17 Drawing Sheets

(56) References Cited

OTHER PUBLICATIONS

Warner, "Windows 8 Platform Preview Navigation Tips and Tricks", Retrieved at <<http://www.quepublishing.com/articles/article.aspx?p=1768323&seqNum=2>>, Retrieval Date: Sep. 19, 2012, pp. 1-4.

"Make Great Windows Stor Apps", Retrieved at <<http://msdn.microsoft.com/en-us/library/windows/apps/hh464920.aspx>>, Retrieval Date: Sep. 19, 2012, pp. 1-4.

"International Search Report & Written Opinion for PCT Patent Application No. PCT/US2013/063962", Mailed Date: Feb. 25, 2014, Filed Date: Oct. 9, 2013, 9 Pages.

\* cited by examiner

UNIFIED COMMUNICATIONS APPLICATION FUNCTIONALITY IN CONDENSED VIEWS

BACKGROUND

Computer-implemented unified communications applications enable users thereof to receive and transmit real-time communications by way of a plurality of differing communications modalities. For instance, an exemplary unified communications application can be configured to support instant messaging, teleconferencing, video conferencing, voicemail retrieval, calendar syncing, content sharing, amongst other communications modalities.

Conventionally, most unified communications applications are installed on computing devices that have operating systems installed thereon that employ a windowing model, such that a user of a computing device can have multiple applications executing simultaneously. For example, on a traditional computing desktop, the user can be participating in a meeting by way of the unified communications application while accessing other applications in different windows, such as an email application, a web browser, a word processor, or the like. The user can size and arrange application windows to allow the user to multi-task; thus, the user can participate in the meeting while performing some other task. In another example, the user can minimize the unified communications application and rely on a conventional task bar to notify the user when a new real-time communication (such as a new instant message) has been received by way of the unified communications application. For instance, an icon that represents the unified communications application can be highlighted in the task bar when a new real-time communication is received.

Relatively recently, however, mobile computing devices, such as tablet computing devices (sometimes referred to as slate computing devices), mobile phones, mobile media players, and the like have increased in popularity. Due at least in part to the relatively small size of display screens on such mobile computing devices compared to conventional computer displays, the windowing model utilized in operating systems installed on desktop computing devices may not be ideal for mobile computing devices. Thus, "window-less" operating systems are currently being developed and deployed. Accordingly, conventional techniques for multi-tasking may be inoperable with such window-less operating systems.

SUMMARY

The following is a brief summary of subject matter that is described in greater detail herein. This summary is not intended to be limiting as to the scope of the claims.

Described herein are various technologies pertaining to a unified communications application executing on a computing device with a window-less operating system installed thereon. In an exemplary embodiment, the unified communications application can be displayable in one of two views that are selectable by user: 1) a first view where the unified communications application is displayed on less than 50% of a display screen of the computing device; and 2) a second view where the unified communications application is displayed on more than 50% of the display screen of the computing device. The first view can be referred to herein as a condensed view, and second view can be referred to herein as a full view. For example, when the unified communications application is displayed in the full view, the unified communications application can be displayed on an entirety of the display screen of the computing device. In another example, when the unified communications application is displayed in the full view, such application can be displayed together with a second computer executable application that is displayed in a condensed view (accordingly, the unified communications application displayed in the full view is shown on a larger portion of the display screen than the second application displayed in its condensed view).

The unified communications application described herein supports multiple communications modalities, including but not limited to real-time communications modalities such as instant messaging, teleconferencing, video conferencing, and content sharing. The unified communications application can further support non-real-time communications modalities, such as retention, retrieval, and playback of voice mails, video mails, offline messages, calendar syncing, amongst others. When displayed in the condensed view, the unified communications application can receive real-time communications from a contact of a user of such application, and can display/audibly output the real-time communications. Similarly, when displayed in the condensed view, the unified communications application can transmit real-time communications generated by the user. Accordingly, the user of the unified communications application can multi-task by participating in real-time conversations via the unified communications application while interacting with another application displayed in its respective full view on the display screen of the computing device. Exemplary communications modalities supported by the unified communications application in the condensed view include instant messaging, audio conferencing, video conferencing, and content sharing.

Furthermore, the unified communications application can be configured to retain user context when the user causes the unified communications application to transfer from the full view and the condensed view, and vice versa. For example, the user may be participating in a group instant messaging conversation, and may cause the unified communications application to transition from being displayed in the full view to being displayed in the condensed view. The unified communications application can retain the instant messaging conversation in the condensed view, such that the context of the conversation is preserved. Likewise, as the user causes the unified communications application to be transitioned from the full view to the condensed view and vice versa, graphical data can be presented to the user that is informative as to the context of the application when the user caused the view to be switched. For instance, a graphical button corresponding to a particular screen of the unified communications application when such application was displayed in the full view can be highlighted when the user causes the unified communications application to be displayed in the condensed view. Exemplary screens include a first screen that graphically depicts contacts of the user, a second screen that graphically depicts conversation history of the user, and a third screen that facilitates voicemail retrieval, although the screens are not so limited.

Other aspects will be appreciated upon reading and understanding the attached figures and description.

DETAILED DESCRIPTION

Figure 1:
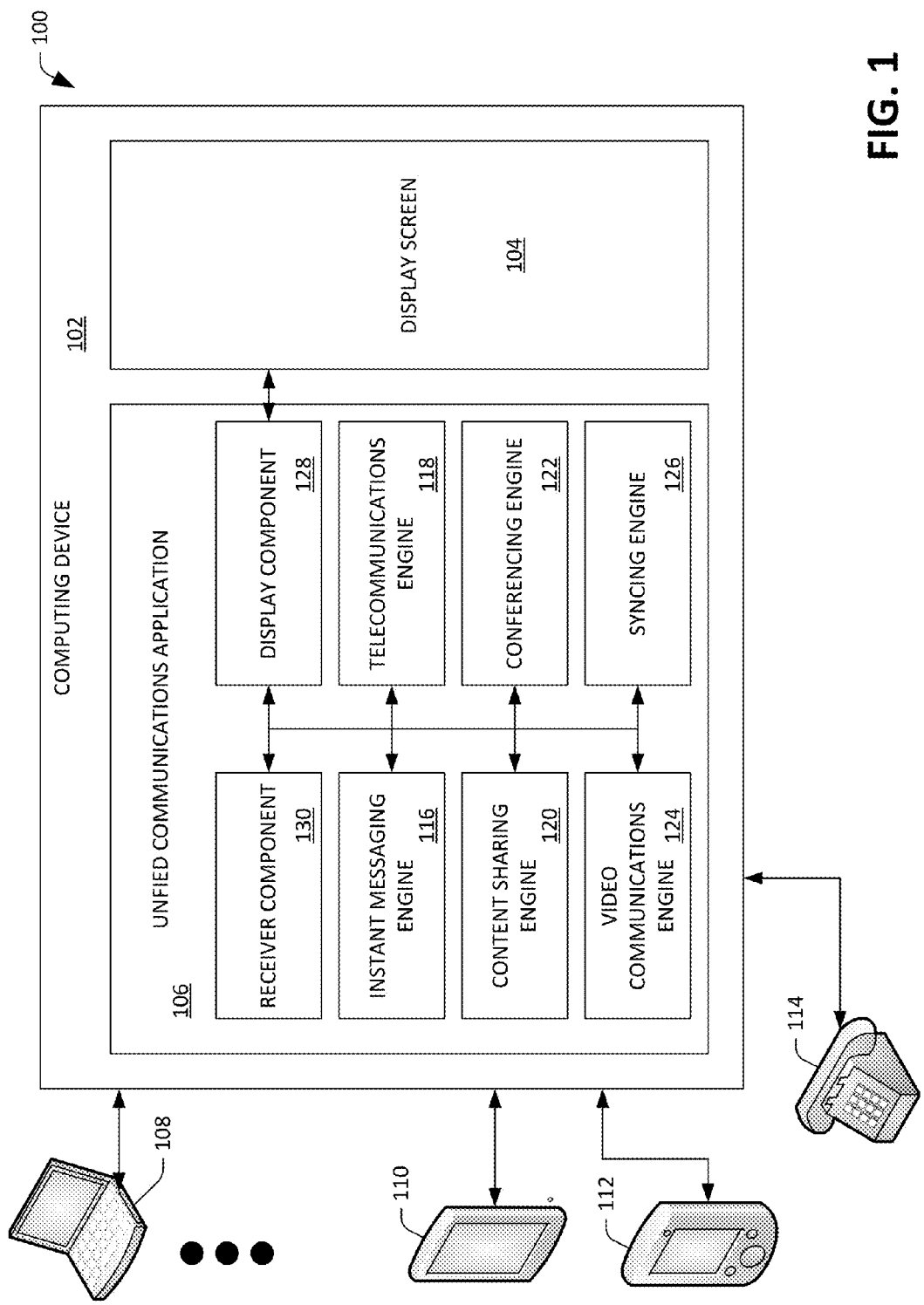
FIG. 1 is a functional block diagram of an exemplary system that supports real-time communications by way of a unified communications application executing on a computing device.

Various technologies pertaining to a unified communications application will now be described with reference to the drawings, where like reference numerals represent like elements throughout. In addition, several functional block diagrams of exemplary systems are illustrated and described herein for purposes of explanation; however, it is to be understood that functionality that is described as being carried out by certain system components may be performed by multiple components. Similarly, for instance, a component may be configured to perform functionality that is described as being carried out by multiple components. Additionally, as used herein, the term "exemplary" is intended to mean serving as an illustration or example of something, and is not intended to indicate a preference.

As used herein, the terms "component", "system", and "engine" are intended to encompass computer-readable data storage that is configured with computer-executable instructions that cause certain functionality to be performed when executed by a processor. The computer-executable instructions may include a routine, a function, or the like. It is also to be understood that a component or system may be localized on a single device or distributed across several devices.

With reference now to FIG. 1, a functional block diagram of an exemplary system 100 that facilitates real-time communications by way of a unified communications application is illustrated. The system 100 comprises a computing device 102, which can be but is not limited to being a desktop computing device, a laptop computing device, a tablet computing to device (which may also be referred to as a slate computing device), a mobile telephone, a portable media player, or the like. The computing device 102 comprises a display screen 104 that is employed to present graphical data to a user of the computing device 102. While the display screen 104 is shown as being integral to the computing device 102, it is to be understood that the display screen 104 may be physically separated from the computing device 102.

The computing device 102 executes a unified communications application 106, which supports communications modalities, wherein the communications modalities include real-time communications modalities and non-real-time communications modalities. The system 100 further comprises a plurality of devices 108-114, which can be employed to communicate with a user of the computing device 102 by way of the unified communications application 106. Accordingly, the devices 108-114 can be in communication with the computing device 102 by way of a suitable network or networks. The plurality of devices 108-114 can include computing devices such as a laptop computing device, a desktop computing device, a tablet computing device, a mobile telephone, a portable media player, etc. Such types of computing devices can have instances of the unified communications application installed and executing thereon, and can be in communication with the computing device 102 by way of the Internet, an intranet, a cellular network, a local area network, and/or some other suitable digital packet-based network. The devices 108-114 can also include other communications devices, such as a landline telephone, which can be in communication with the computing device 102 at least partially by way of the Public Switched Telephone Network (PSTN).

As noted above, the unified communications application 106 can support multiple modes of communication. For example, the unified communications application 106 can comprise an instant messaging engine 116 that supports receipt and transmittal of instant messages. In an exemplary embodiment, the device 108 can have an instance of the unified communications application or other compatible instant messaging client installed thereon, and can communicate with a user of the computing device by way of the instant messaging engine 116. The instant messaging engine 116 can support peer-to-peer instant messaging as well as group messaging, such that multiple users and/or groups of users can simultaneously participate in a conversation through utilization of instant messaging.

The unified communications application 106 can also comprise a telecommunications engine 118 that supports real-time voice conversations (conferences). In an exemplary embodiment, the unified communications application 106 can have a telephone number assigned thereto, such that the user of the computing device 102 can be reached by another user by way of the telephone number. In another exemplary embodiment, the telecommunications engine 118 can support real-time voice communications with users of computing devices that have instances of the unified communications application 106 (or other compatible voice conferencing application) respectively installed thereon. The telecommunications engine 118 can support peer-to-peer audio conversations as well as audio conferences that include three or more participants.

Further, the unified communications application 106 may include a content sharing engine 120 that facilitates sharing of a computer executable file or desktop of a computing device between participants in a conversation undertaken by way of the application 106. In an example, the user of the computing device 108 may have an instance of the unified communications application 106 installed thereon, and may be participating in an audio conference with a user of the computing device 102. The user of the computing device 108 may desirably share the desktop of the computing device 108 with the user of the computing device 102, such that the user of the computing device 108 and the user of the computing device 102 can simultaneously view the same content despite being remotely located from one another. Further, the content sharing engine 120 can support multi-party content sharing, such that content shared by the user of the computing device 102, for example, can be simultaneously viewed by multiple users of respective devices 108-112.

The unified communications application 106 may also comprise a conferencing engine 122 that is employable to support multi-party conferencing. For example, the user of the computing device 102 can establish a particular time for a conference and can invite attendees to the conference by way of the conferencing engine 122. Pursuant to an example, the conferencing engine 122 can be in communication with a calendaring application installed on the computing device 102, such that the user of the computing device 102 can view calendars of prospective invitees to a conference established by way of the conferencing engine 122.

Still further, the unified communications application 106 may also comprise a video communications engine 124 that can support real-time video conferencing. For instance, the computing device 102 may have a camera integral thereto or in communication therewith, and the video communications engine 124 can receive video captured by such camera. The video communications engine 124 may then format audio/video data captured by the camera (and corresponding microphone) for transmittal to at least one of the devices 108-112 that is employed by a user that is participating in a real-time video conversation with the user of the computing device 102. The video communications engine 124 can also receive video data from one or more of the devices 108-112, and can form such video data for display on the display screen 104 of the computing device 102.

Still further, the unified communications application 106 may also comprise a syncing engine 126 that is employed to synchronize the unified communications application 106 with other applications installed on the computing device 102 and/or other instances of the unified communications application 106 installed on other computing devices of the user of the computing device 102. For example, such user may have instances of the unified communications application 106 installed on a cell phone, a tablet computing device, a laptop computing device, etc. Additionally, the computing device 102 may have a calendaring application installed thereon that identifies times and dates of conferences in which the user of the computing device 102 is scheduled to participate. The syncing engine 126 can synchronize with such calendaring application and can further synchronize with other instances of the unified communications application 106 installed on other computing devices of the aforementioned user, such that the user can have access to the above described calendaring data regardless of the computing device being used.

Oftentimes, a user of the computing device 102 may wish to multi-task, such that the user wishes to participate in real-time communications by way of the unified communications application 106 while interacting with another computer-executable application. During an audio conference, for instance, the user may wish to review an e-mail retained in an e-mail application. In another example, the user of the computing device 102 may wish to access a web browser during a video conference to search for information pertaining to a topic discussed in such video conference. Conventionally, in computing devices with operating systems that conform to a windowing model, multitasking is enabled through interaction with multiple windows and the task bar. In emerging operating systems, however, the windowing model is not employed; rather, a "flat" model is utilized. Users, however, are likely to continue to desire the ability to multi-task, particularly when employing the unified communications application 106.

To facilitate multi-tasking, the unified communications application 106 can comprise a display component 128 that is configured to cause the unified communications application 106 to be presented on the display screen 104 in one of two display views: 1) a full display view, wherein the unified communications application 106 consumes over 50% of the display screen 104; and 2) a condensed view, wherein the unified communications application 106 consumes less than 50% of the display screen 104. In an exemplary embodiment, the display component 128 can cause the unified communications application 106 to consume between 70% and 100% of the display screen 104. For instance, the unified communications application 106 can consume an entirety of the display screen 104 when the user of the computing device 102 is not multi-tasking, and can consume approximately 70% of the display screen 104 when the user is interacting with another application that is being displayed in its condensed view. Similarly, when the display component 128 displays the unified communications application 106 in the condensed view, the unified communications application 106 can consume approximately 30% of the display screen 104 (while the remainder of the display screen 104 is consumed by another computer executable application displayed in its respective full view).

Thus, the display component 128 can cause the unified communications application 106 to be displayed in one of its full view or condensed view, wherein the full view of the unified communications application 106 may provide additional functionality and/or graphical data when compared to the condensed view. While the display component 128 is described herein is displaying the unified communications application 106 in a binary manner (either in the condensed view or the full view), it is contemplated that increasing screen sizes may allow for the display component 128 to display the unified communications application 106 in intermediate views. It is to be understood, however, that the display component 128 is configured to display the unified communications application 106 in preset views, which is distinct from dynamic window scaling that can be undertaken in operating systems utilizing the conventional windowing model.

The unified communications application 106 additionally includes a receiver component 130 that receives an indication from a user of the computing device 102 that the unified communications application 106 is desirably displayed in the condensed view on the display screen 104. Such indication can be received by the receiver component 130 from the user in the form of, for example, a gesture, such as a movement of a finger, stylus, or the like in a particular direction on the display screen 104. For instance, contacting the display screen 104 on an upper portion thereof and moving the finger downwardly can be an indication that the user wishes to cause the unified communications application 106 to be displayed in the condensed view. In another example, movement of a finger in either direction horizontally along the display screen 104 can indicate to the receiver component 130 that the user of the computing device 102 wishes to have the unified communications application 106 displayed in the condensed view. In still another exemplary embodiment, the user of the computing device 102 can employ a mouse and use click and drag techniques to inform the receiver component 130 that the user wishes to have the unified communications application 106 displayed in its condensed view. In yet another exemplary embodiment, the computing device 102 may have a microphone integral thereto, and the user of the computing device 102 can generate a voice command to inform the receiver component 130 that the unified communications application 106 is desirably displayed in the condensed view. In still yet another exemplary embodiment, the computing device 102 may have a video camera therein or connected thereto, and the user of the computing device 102 can inform the receiver component 130 of a desire to cause the unified communications application 106 to be displayed in the condensed view by way of a natural gesture, such as the movement of a hand or arm in a certain direction.

Responsive to the receiver component 130 receiving such indication from the user of the computing device 102, the display component 128 can cause the unified communications application 106 to be displayed on the display screen 104 in the condensed view. The unified communications application 106, when displayed on the display screen 104 in the condensed view, is configured to receive real-time communications from at least one of the devices 108-114 and display/audibly output such real-time communications to the user of the computing device 102. Similarly, the unified communications application 106, when displayed by the display component 128 in the condensed view, can receive real-time communications from the user of the computing device 102 and transmit such real-time communications to at least one of the devices 108-114. Thus, the user can participate in a real-time conversation using the unified communications application 106 when such application 106 is displayed in a condensed view, thereby allowing the user to additionally interact with another application displayed on the display screen 104 in its full view.

In an example, and as will be shown in greater detail herein, when the unified communications application 106 is displayed on the display screen 104 in the condensed view, the instant messaging engine 116 can receive an instant message from the computing device 108, such instant message can be displayed in the unified communications application 106 in the condensed view on the display screen 104 of the computing device 102. The user of the computing device 102 can then respond to the instant message by way of the unified communications application 106, while such application 106 remains in the condensed view. As will be shown below, the unified communications application 106, when displayed in the condensed view on the display screen 104, can also support (receive and display) video communications, content sharing, telecommunications, and the like.

Figure 2:
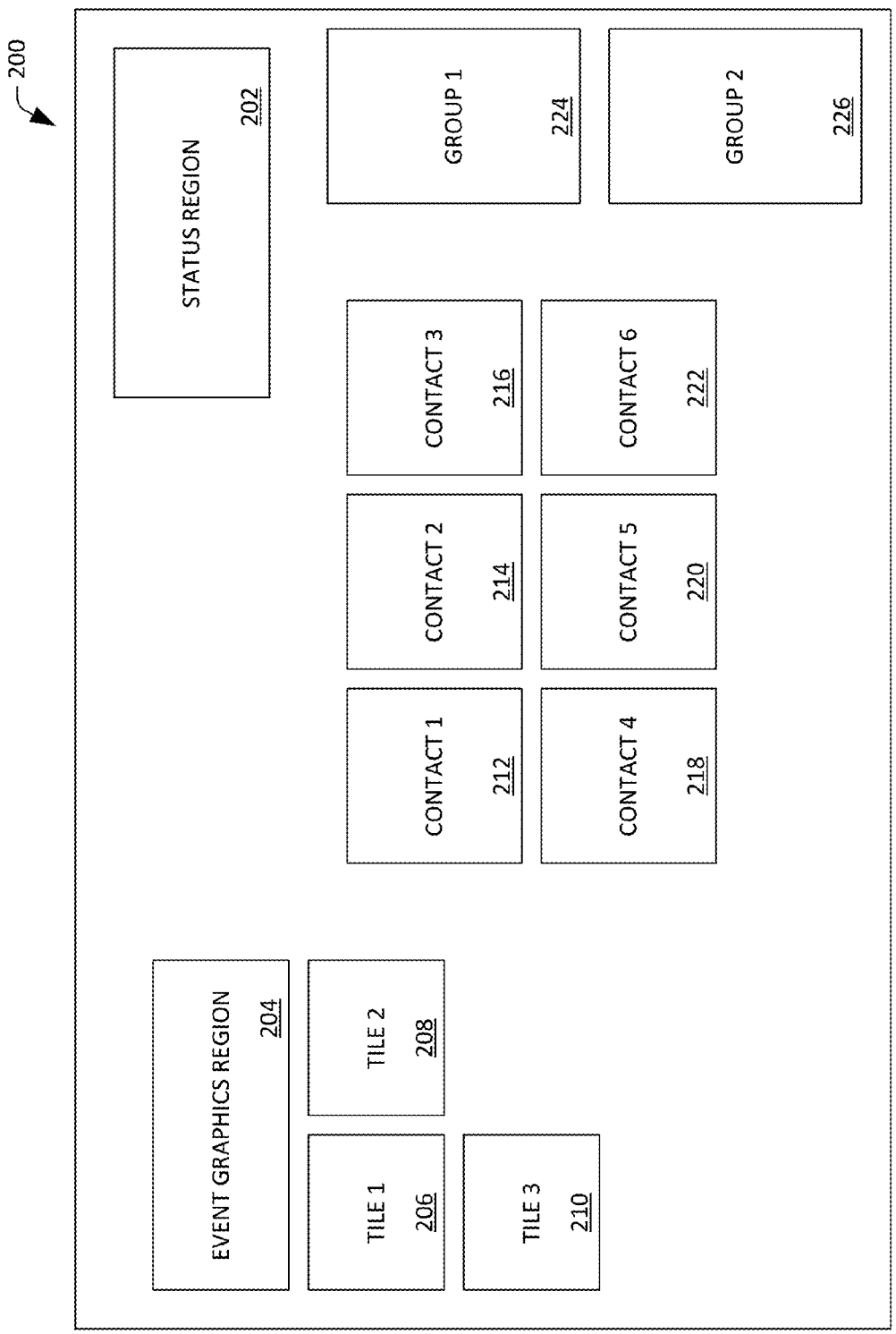
FIG. 2 is an exemplary graphical user interface of the unified communications application when displayed in a full view

With reference now to FIG. 2, an exemplary graphical user interface 200 of the unified communications application 106 when displayed in a full view is illustrated. The graphical user interface 200 can be presented to the user of the unified communications application 106 when initiated by such user and/or when the user is not participating in any conversations. The graphical user interface 200 comprises a status region 202 that displays a status of the user of the unified communications application 106, such as "away", "busy", "available", "in a meeting", or the like. The status region 202 can comprise a selectable region or pull-down menu that allows the user of the unified communications application 106 to modify the status. Additionally, the status shown in the status region 202 is what is presented to contacts of the user of the unified communications application 106 who may wish to communicate with such user.

The graphical user interface 200 may further comprise an event graphics region 204 that graphically depicts upcoming events in which the user of the unified communications application 106 is scheduled to participate. For example, the event graphics 204 can display information pertaining to a meeting in which the user of the unified communications application 106 is scheduled to next participate, wherein such information can include date and time of the meeting, location of the meeting, other participants of the meeting, initiator of the meeting, etc. Information shown in the event graphics region 204 can be retrieved by, for example, the syncing engine 126 from a computer-readable calendar of the user. The event graphics region 204 may also comprise a selectable graphical tile or text that causes the user of the unified communications application 106 to join the meeting identified in the event graphics region 204 through employment of the unified communications application 106.

The graphical user interface 200 additionally comprises a plurality of tiles 206-210, wherein the selection of one of the tiles 206-210 causes certain information to be displayed or another graphical user interface to be presented. For example, selection of the tile 206 can cause graphical data identifying contacts of the user of the unified communications application 106 to be presented on the display screen 104. In another example, depression of the tile 208 can cause historic communications or communications awaiting review to be displayed to the user by way of the unified communications application 106. Such communications can be, but are not limited to being, unread off-line instant messages, e-mails, etc. In another example, selection of the tile 208 can cause historical real-time communications to be displayed in a graphical user interface, such as previous previously received instant messages (over some predefined time range). Selection of the button 210 can cause, for example, voicemails accessible by way of the unified communications application 106 to be retrieved and audibly output to the user. The tiles 206-210 can be dynamic in nature, such that they provide information as to number of messages awaiting review, number of voicemails, etc., and can update as such numbers change.

The graphical user interface 200 may further comprise a plurality of tiles 212-222 that include data that identifies respective contacts of the user of the computing device 102. The contacts identified by the tiles 212-222 can be contacts with whom the user of the unified communications application 106 most frequently communicates; accordingly, when the user initiates the unified communications application 106, the user can quickly begin a real-time communication with a contact with whom the user frequency communicates by selecting an appropriate one of the tiles 212-222. Pursuant to an example, each tile in the plurality of tiles 212-222 can be dynamic in nature. For example, the tile 212 can display an image that identifies a contact, and the tile 212 can dynamically change content to show text identifying a status of the contact; thereafter, the tile 212 can again change to illustrate a most recent online activity shared by the contact (e.g. online social networking posts). Accordingly, the user of the unified communications application 106 can review the tiles 212-222 and ascertain availability and activities of the contacts of the user of the unified communications application 106.

The graphical user interface 200 may further comprise tiles 224 and 226 that identify groups in which the user of the unified communications application 106 is a member. The tiles 224 and 226 can include data that identifies members of the groups represented by such tiles, most recent communications made by members of such groups, and the like. Pursuant to an example, the user of the unified communications application 106 can initiate real-time communications with a group by selecting a respective one of the tiles 224-226.

Figure 3:
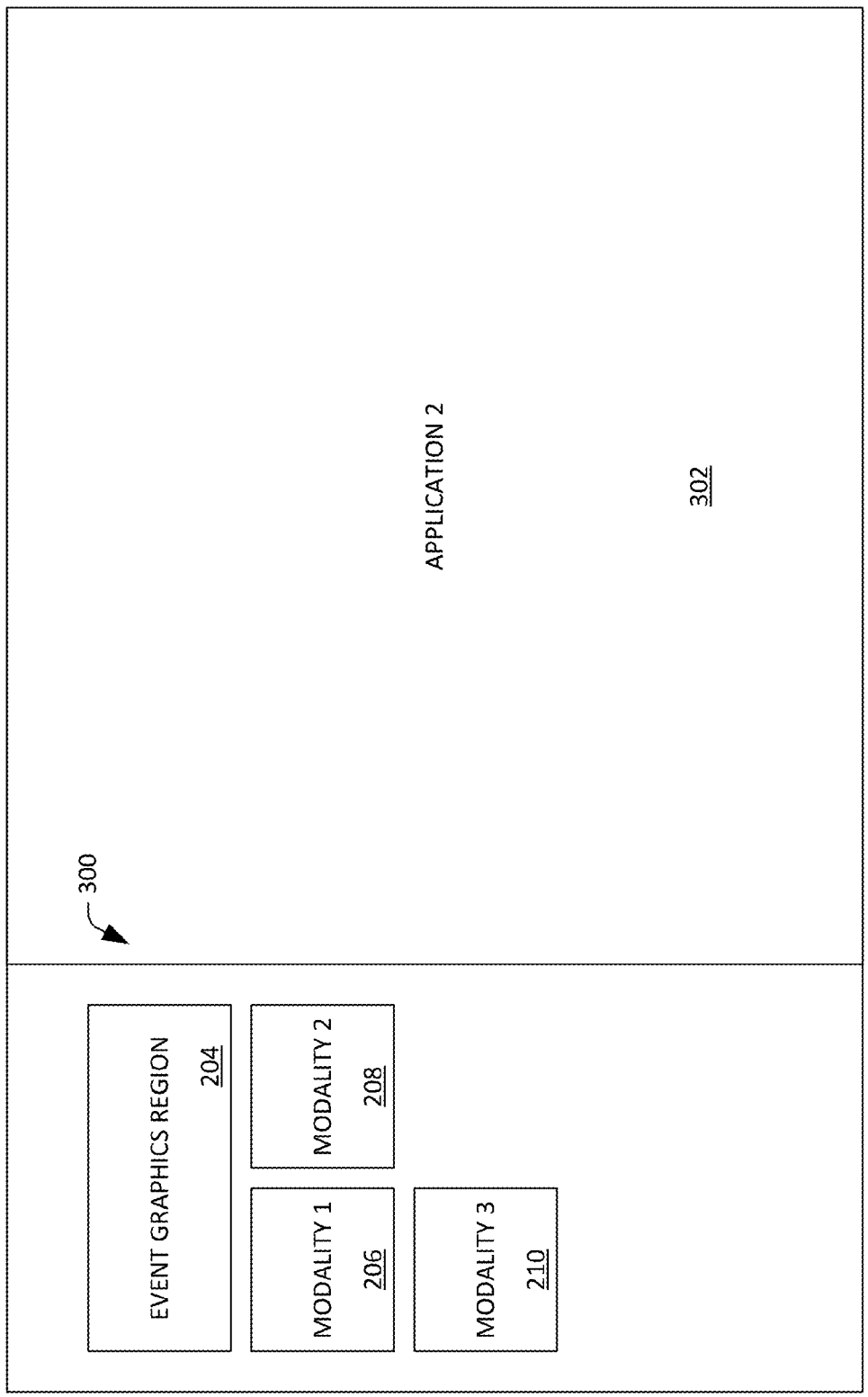
FIG. 3 is an exemplary graphical user interface of the unified communications application that corresponds to the graphical user interface of FIG. 2 when the unified communications application is displayed in a condensed view.

Turning now to FIG. 3, an exemplary graphical user interface 300 of the unified communications application 106 in the condensed view is illustrated. The graphical user interface 300 corresponds to the graphical user interface 200 (e.g., the graphical user interface 300 is a corresponding condensed view of the full view shown in graphical user interface 200). The graphical user interface 300 of the unified communications application 106 in the condensed view, as shown, consumes less than 50% of the display screen 104. The remainder of the display screen 104 is consumed by another application 302 executing on the computing device 102. For example, the other application may be a word processing application, a browser, or the like. In another exemplary embodiment, the other application 302 may be a conventional desktop view that is based on the windowing paradigm. In such an embodiment, it is to be understood that the graphical user interface 300 does not conform to the windowing model.

In the condensed view, the graphical user interface 300 of the unified communications application 106 comprises the event graphics region 204 and the tiles 206-210, which act as described above. It can be ascertained, however, that the graphical user interface 300 fails to include the status region 202, the plurality of tiles 212 through 222, or the tiles to 224 and 226. If the user selects an event shown in the event graphics region 204, the unified communications application 106 can automatically transition to its full view and the selected event (meeting) can be joined. Similarly, if the user selects any of the tiles 206-210, the unified communications application 106 can automatically transition to the full view that corresponds to the selected tile. While not shown in the graphical user interface 300, the graphical user interface 300 can comprise additional graphical data such as selectable buttons that allow the user of the unified communications application 1062 control a communications modality, such as muting a microphone, turning on and off a camera, and the like.

In an exemplary embodiment, data displayed in the event graphics region 204 and one or more of the tiles 206-210 can be based upon information obtained via synchronizing with another computer executable application. In some cases, the computing device 102 may not have such application installed thereon. Accordingly, a tile may be hidden (e.g. such as the 3rd tile 210 that may correspond to voicemail). Still further, the unified communications application 106 when displayed in the condensed view, as shown in FIG. 3, can include graphical indicia that informs the user of the unified communications application 106 of a most recent context when displayed in a full view. For example, if the user of the unified communications application 106 was viewing contacts when the application is in the full view, and then causes the application 106 to transition to the condensed view, then a tile in the graphical user interface 300 can be highlighted to remind the user of a most recent context.

Figure 4:
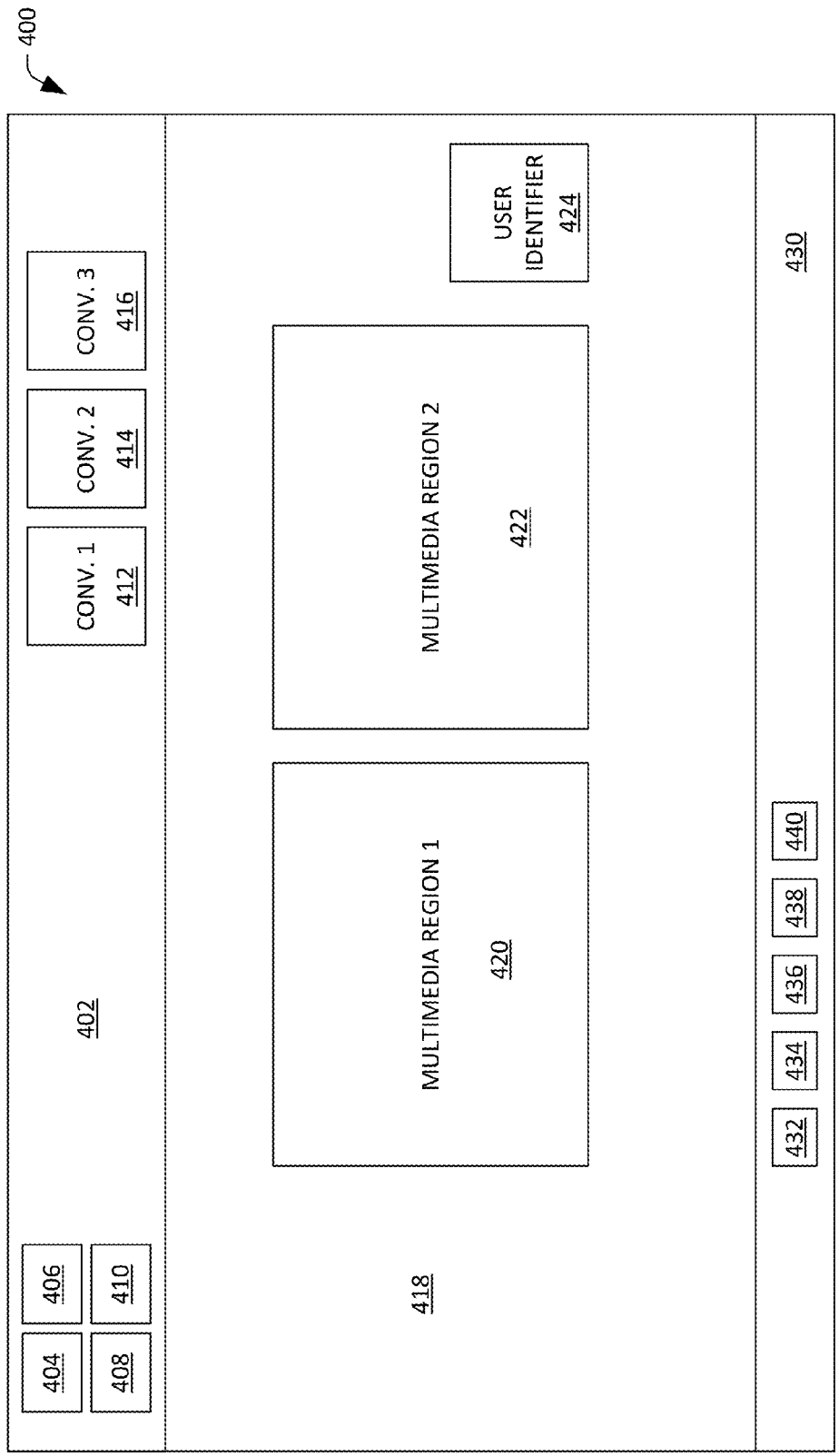
FIG. 4 is an exemplary graphical user interface of the unified communications application when displayed in a full view.

With reference now to FIG. 4, an exemplary graphical user interface 400 of the unified communications application 106 in the full view is illustrated. The graphical user interface 400 can be displayed when the application 106 is employed in connection with real-time communications involving multimedia. The graphical user interface 400 comprises a navigation bar 402 that includes a first plurality of tiles 404-410 that, when selected, cause particular functionality to be enabled. For example, the first tile 404, when selected, can cause graphical data identifying contacts of the user of the unified communications application 106 to be displayed, such that contacts with whom a real-time conversation can be selected. The second tile 406, when selected, can cause historic communications between the user of the unified communications application 106 and contacts thereof to be presented on the display screen 104. Selection of the third tile 408 can cause a graphical user interface to be displayed that facilitates instant messaging. Selection of the fourth tile 410 can cause voicemails accessible by the unified communications application 106 to be retrieved and audibly output to the user.

The navigation bar 402 can further comprise a plurality of tiles 412-416 that are representative of active conversations in which the user of the unified communications application 106 is participating. Thus, for example, selection of the tile 412 can cause a conversation represented by such tile to be presented in the graphical user interface 400.

The graphical user interface 400 additionally comprises a conversation region 418 that depicts data pertaining to a conversation in which the user of the unified communications application 106 is currently participating. In the example shown in FIG. 4, the conversation region 418 includes three participants: the user of the unified communications application 106 and two others. Additionally, the conversation depicted in this figure includes multimedia. The conversation region 418 includes two multimedia regions 420 and 422 corresponding to the other two participants in the conversation. For example, the first multimedia region 420 can be a video feed showing actions of a first participant in the conversation, while the second multimedia region 422 can be a video feed of a second participant in the conversation. In other embodiments, at least one of the first multimedia region 420 or the second multi-media region 422 can include content that is shared by at least one of the participants in the meeting. The conversation region 418 can optionally include a user identifier 424 that comprises graphical data that identifies the user of the unified communications application 106. Thus, for example, the user identifier 424 can include an image or video feed of the user of the unified communications application 106.

The graphical user interface 400 may also optionally comprise an application bar 430 that includes a plurality of selectable tiles 432-440. Such selectable files 432-440 can be employed to respectively control different portions of a conversation. For example, the tile 432 can be selected to mute and unmute the user of the unified communications application 106. The tile 434 can be configured to display an instant message region and a text input field in the conversation region 418 or another graphical user interface, or remove the instant message region and the text input field from the conversation region 418 when selected by the user of the unified communications application 106.

The third selectable tile 436 can be configured to, for example, end the participation of the user of the unified communications application 106 in a conversation, end the audio and/or video portion of the conversation, or the like. The fourth selectable tile 438 can be configured to control a video portion of a conversation. For example, the user of the unified communications application 106 can select the fourth selectable tile 438 to cause video of the user to be transmitted to other participants in the conversation or to prevent video of the user to be transmitted to other participants of the conversation.

The fifth selectable tile 440 can be employed to control content sharing. For instance, if the user of the unified communications application 106 wishes to share content, the user can select the fifth selectable tile 440. Similarly, if the user wishes to cease sharing content, the user can select the fifth selectable tile 440. In another exemplary embodiment, the fifth selectable tile 440 can be employed to begin viewing content that is shared by at least one other participant in the conversation or to cease viewing content that is being shared by at least one other participant in the conversation.

Figure 5:
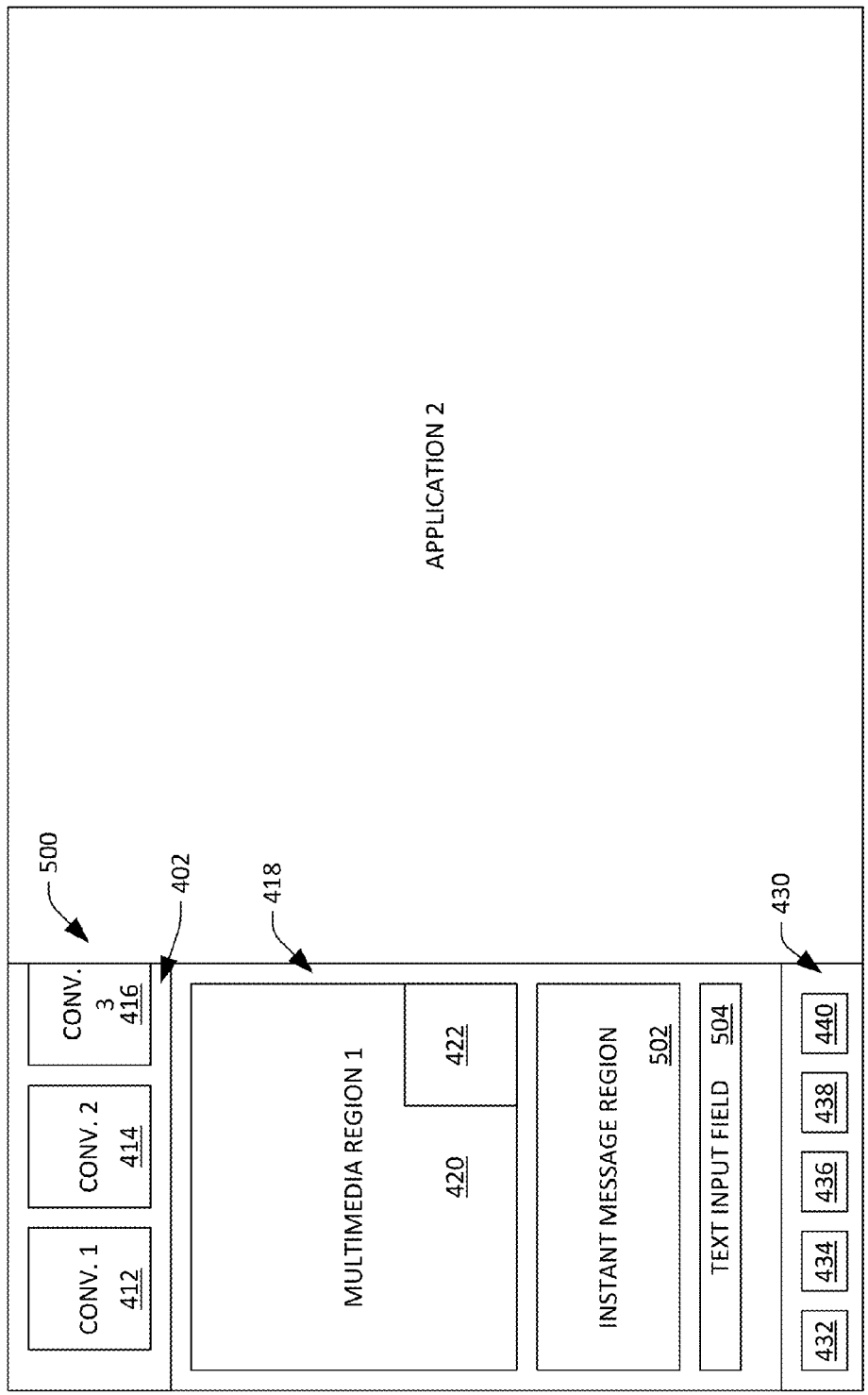
FIG. 5 is an exemplary graphical user interface of the unified communications application that corresponds to the graphical user interface of FIG. 4 when displayed in a condensed view.

With reference now to FIG. 5, an exemplary graphical user interface 500 of the unified communications application 106 in a condensed view is illustrated. The graphical user interface 500 is an exemplary condensed view of the graphical user interface 400. The graphical user interface 500 comprises the navigation bar 402, which includes the selectable tiles 412-416 that are representative of active conversations in which the user of the unified communications application 106 is a participant. The graphical user interface 500 further comprises the conversation region 418, which includes the first multimedia region 420 and the second multimedia region 422, which is positioned as a picture in picture region. The user of the unified communications application 106 may, for example, select the second multimedia region 422 (e.g., through a selection with a finger), which can cause the second multi-media region 422 to be enlarged and the first multimedia region 422 to replace the second multimedia region 422. In another exemplary embodiment, the unified communications application 106 can be configured to automatically select one of the first multimedia region 420 or the second multimedia region 422 as being the larger of the two regions based upon which participant in the conversation is the "dominant" participant (currently speaking or speaking with highest volume).

The conversation region 418 in the graphical user interface 500 additionally includes an instant message region 502 and a text input field 504. The instant message region 502 can display instant messages transmitted between participants in a conversation. The text input field is configured to receive text input, wherein the text input is desirably transmitted as an instant message to other participants in the conversation. The graphical user interface 500 further comprises the application bar 430 that includes the selectable tiles 432-440, which can act as described above. For example, selection of the second tile 434 can cause the instant message region 502 and the text input field 504 to be removed from the conversation region 418, potentially allowing the first multimedia region 420 and/or the second multimedia region 422 to be enlarged in the conversation region 418.

Figure 6:
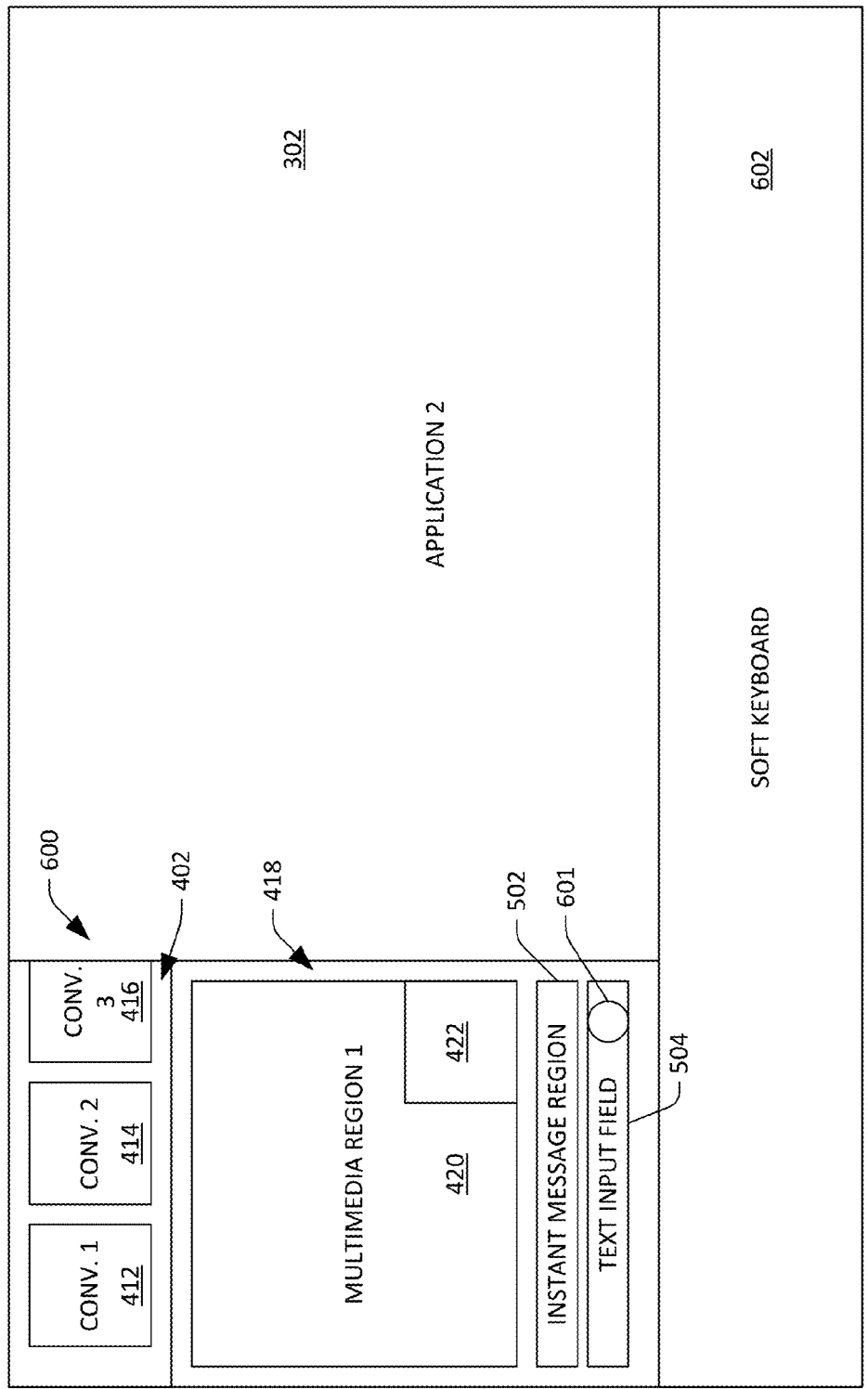
FIG. 6 is an exemplary graphical user interface of the unified communications application in a condensed view.

Now referring to FIG. 6, an exemplary graphical user interface 600 of the unified communications application 106 in the condensed view is illustrated. The graphical user interface 600 is set forth to illustrate that text can be input into the text input field 504 when the unified communications application 106 is in the condensed view. The user can set forth an indication of a desire to input text into the text input field 504 (as shown by graphical object 601). Responsive to receiving such indication, a soft keyboard 602 may be presented on the display screen 104. The soft keyboard 602 may be, for example, a QWERTY keyboard, wherein the user can select keys shown in the soft keyboard 602 to cause text to be set forth in the text input field 504. In an exemplary embodiment, size of the conversation region 418 can be reduced when the soft keyboard 602 is displayed on the display 104. It can be ascertained that in such an embodiment, the display 104 is a touch-sensitive display that facilitates input of text by way of the soft keyboard 602. Further, when the soft keyboard 602 is displayed, the instant message region 502 can be reduced in size and the application bar 430 can be removed. In another exemplary embodiment, while not shown, when the soft keyboard 602 is displayed, the first multimedia region and the second multimedia region 422 can be removed from the graphical user interface 600. Subsequent to desired text being entered and transmitted as an instant message, the first multimedia region 420 and the second multimedia region 422 can be re-presented in the conversation region 418.

Figure 7:
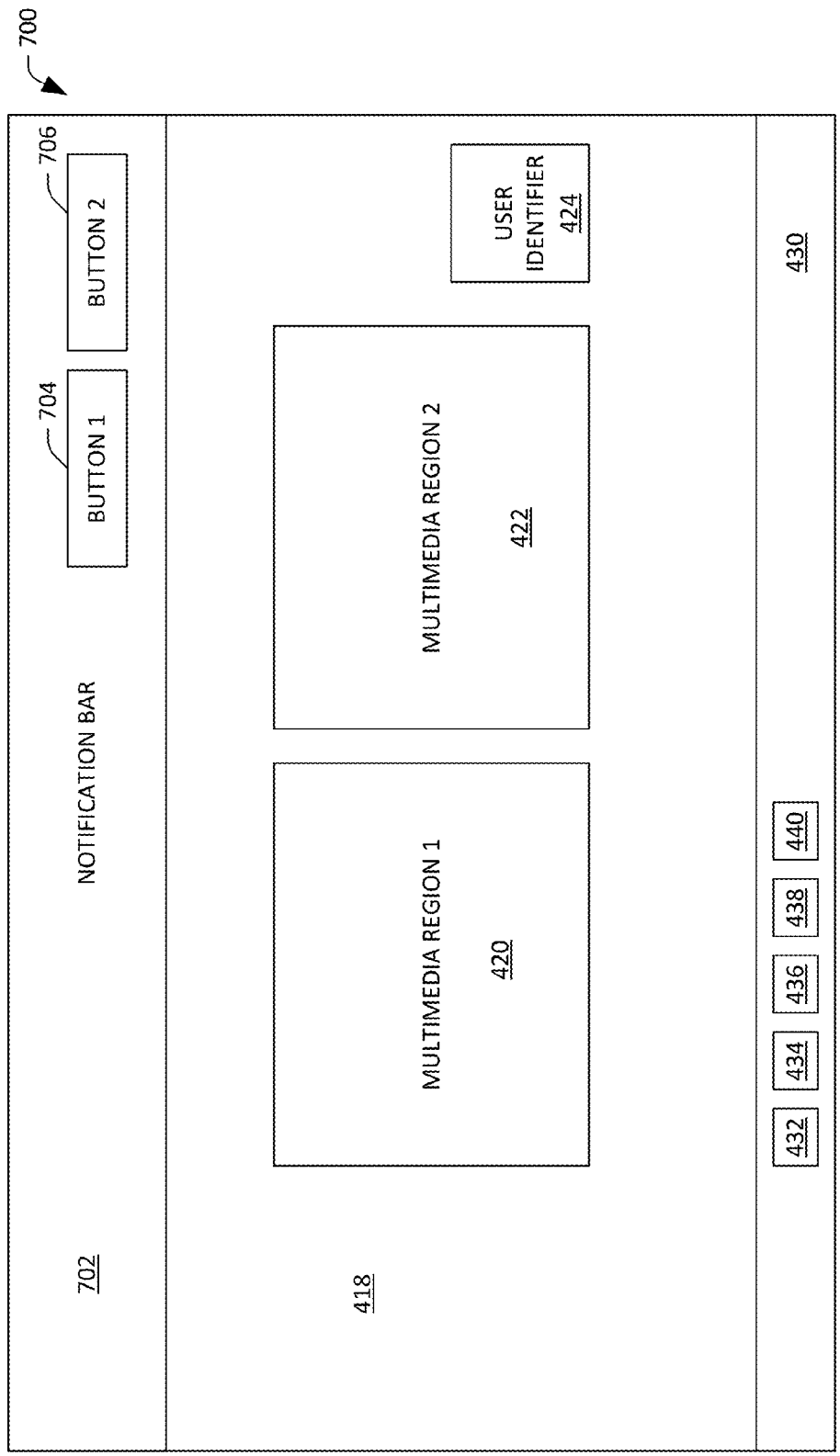
FIG. 7 is an exemplary graphical user interface of the unified communications application displayed in a full view when a notification that requires user input is received.

With reference now to FIG. 7, an exemplary graphical user interface 700 of the unified communications application 106 when displayed in a full view is illustrated. The graphical user interface 700 comprises a notification bar 702 that is presented when a notification for the user of the unified communications application 106 is received. Such notification can pertain to a request to join a conversation, a request to add the user as a contact, or other suitable notification that requests input from the user of the application 106. The notification bar 702 includes a plurality of buttons 704-706, which can be employed by the user of the unified communications application 106 to provide requested input. For example, the user can select the button 704 if the user wishes to be added as a contact of a requesting individual. If the user wishes to decline the request, the user can select the button 706. The notification bar 702 can be presented in a manner that visually distinguishes the notification bar 702 from the conversation region 418. For example, the notification bar 702 can be set forth in a color that is distinct from a color of the conversation region 418.

Figure 8:
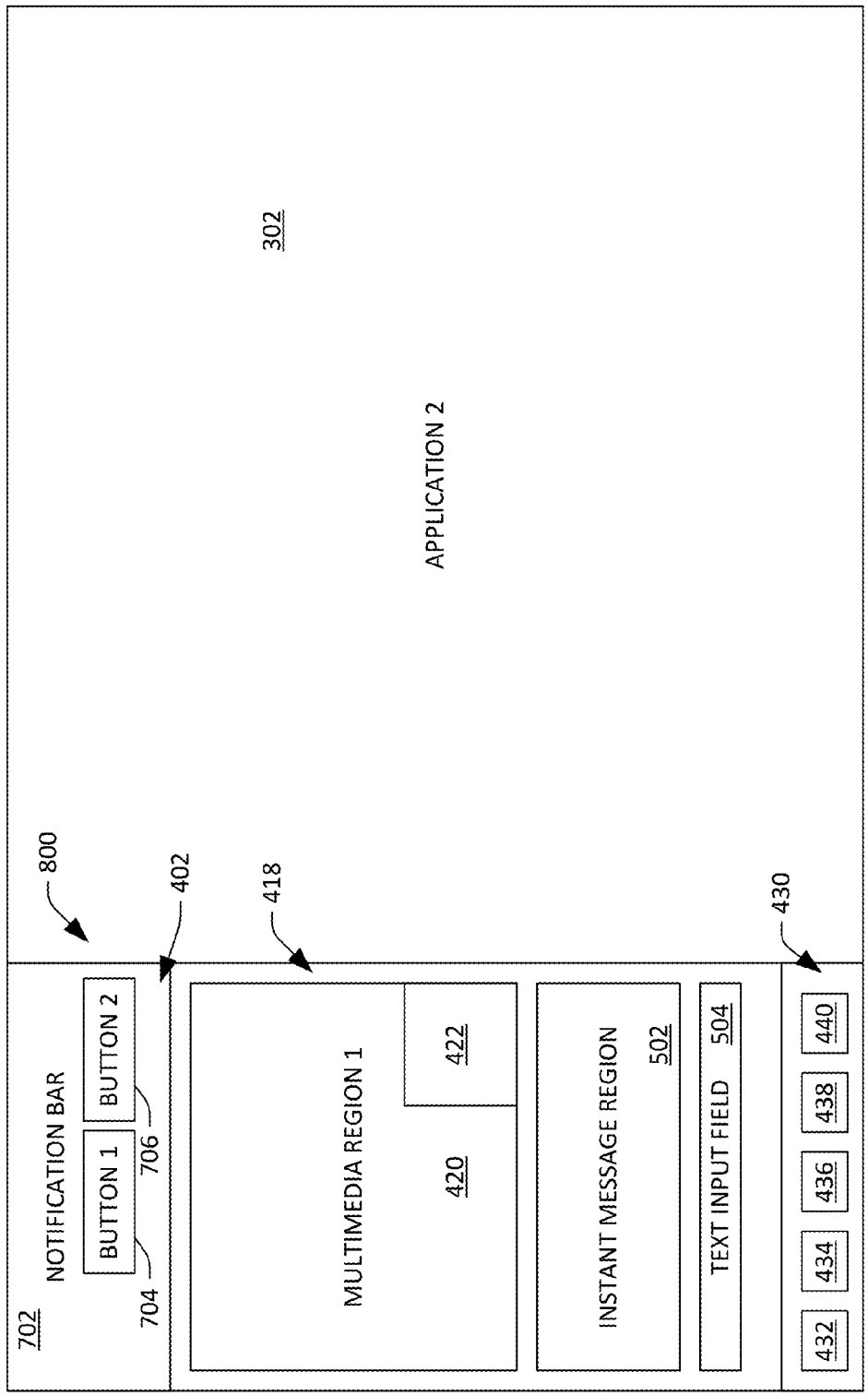
FIG. 8 is an exemplary graphical user interface of the unified communications application that corresponds to the graphical user interface of FIG. 7 when displayed in a condensed view.

Now referring to FIG. 8, an exemplary graphical user interface 800 of the unified communications application 106 when in a condensed view is illustrated. The graphical user interface 800 is the condensed view of the graphical user interface 700 shown in FIG. 7. The graphical user interface 800 includes the notification bar 702 that is presented to the user when a notification requesting user input is received. When compared to the full view, the notification bar 702 is condensed to fit into the space allocated for the unified communications application in the condensed view. It can be ascertained that the user of the unified communications application 106 can respond to the notification set forth in the notification bar 702 without requiring that the unified communications application 106 be displayed in the full view.

Figure 9:
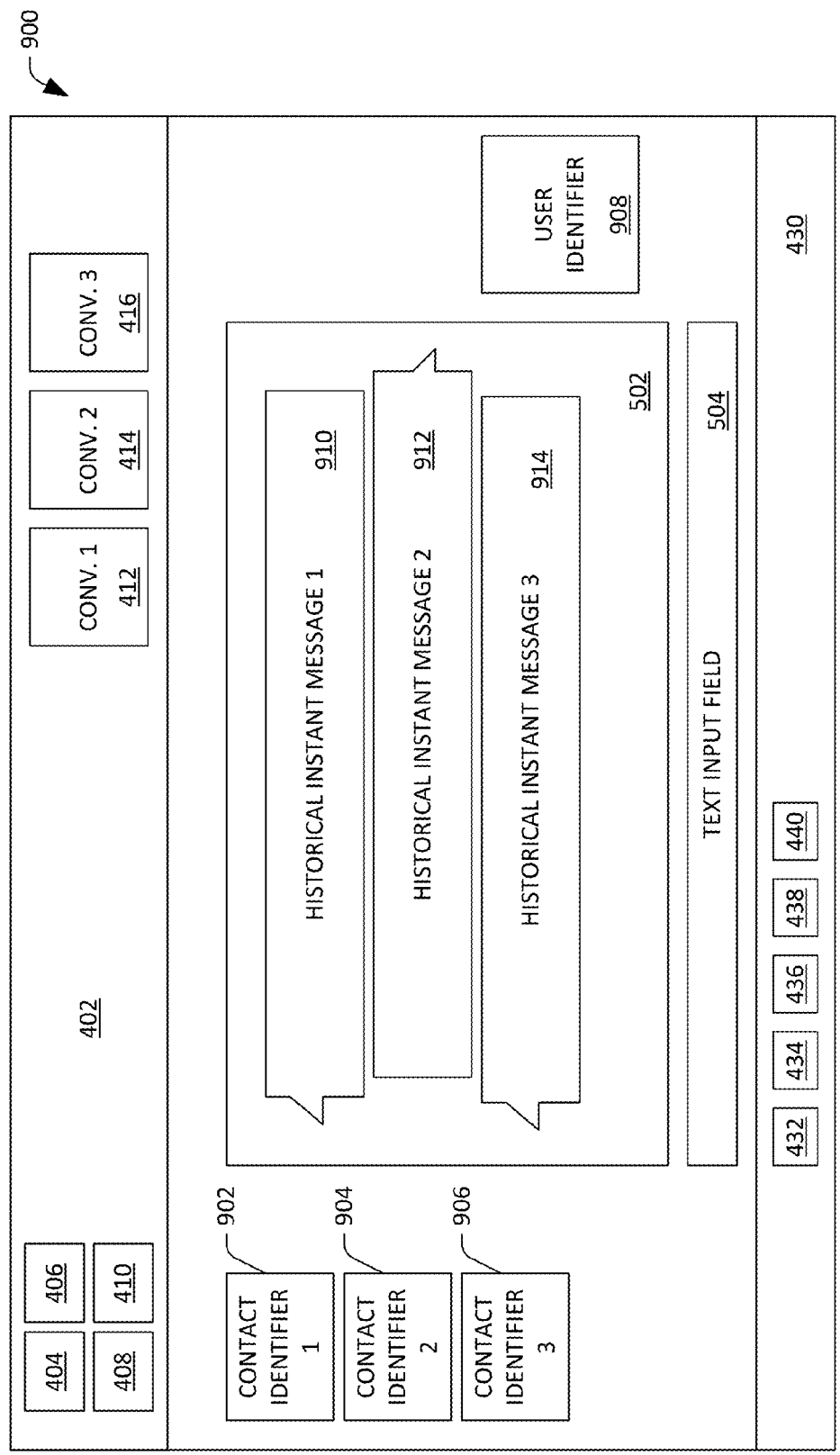
FIG. 9 is an exemplary graphical user interface of the unified communications application displayed in the full view when the unified communications application is employed to conduct an instant messaging conversation.

Now turning to FIG. 9, an exemplary graphical user interface 900 of the unified communications application 106 in a full view is illustrated. The graphical user interface 900 depicts an instant messaging conversation. The conversation region 418 of the graphical user interface 900 includes a plurality of contact identifiers 902-906, wherein the contact identifiers 902-906 identify participants in the instant messaging conversation. While the exemplary graphical user interface 900 illustrates that the instant messaging conversation includes four participants (the three participants identified by the contact identifiers 902-906 and the user of the unified communications application 106), it is to be understood that the conversation may include as few as two participants (a peer to peer instant messaging conversation) or a larger number of participants. The conversation region 418 can further include a user identifier 908 that represents the user of the unified communications application 106.

In an exemplary embodiment, the contact identifiers 902-906 and the user identifier 908 can be images that respectively identify the participants in the instant messaging conversation. In another exemplary embodiment, the contact identifiers 902-906 and the user identifier 908 can be videos of the participants of the conversation. In still yet another exemplary embodiment, at least one of the contact identifiers 902-906 and/or the user identifier 908 may include text that identifies the respective participants in the instant message conversation.

The instant message region 502 comprises a plurality of historic instant messages 910-914. In an exemplary embodiment, each instant message in the instant message region 502 can include a respective identifier that identifies the originator of the instant message as well as a respective time when the instant message was set forth in the conversation. Moreover, each instant message in the plurality of historic instant messages 910-914 can include a respective callout to visually identify to the user of the unified communications application 106 as to whether the user generated the respective instant message or another conversation participant generated the instant message. Still further, historical instant messages 910-914 can be color coded to indicate which conversation participant transmitted the instant message. Additionally, the instant message region 502 can optionally include text that identifies when conversation participants enter or leave the conversation. For example, the instant messaging conversation may be a portion of an instant messaging meeting, where participants enter and leave the conversation over time. To facilitate informing the user of the unified communications application 106 of when conversation participants enter and leave the conversation, text can be placed outside of the instant message bubbles to inform the user of when conversation participants enter and leave the conversation.

Moreover, while not shown, if the user indicates a desire to set forth text into the text input field 504, the soft keyboard 602 can be presented to the user. For instance, the conversation region 418 can be reduced in size to allow for presentment of the soft keyboard 602 on the display screen 104.

Figure 10:
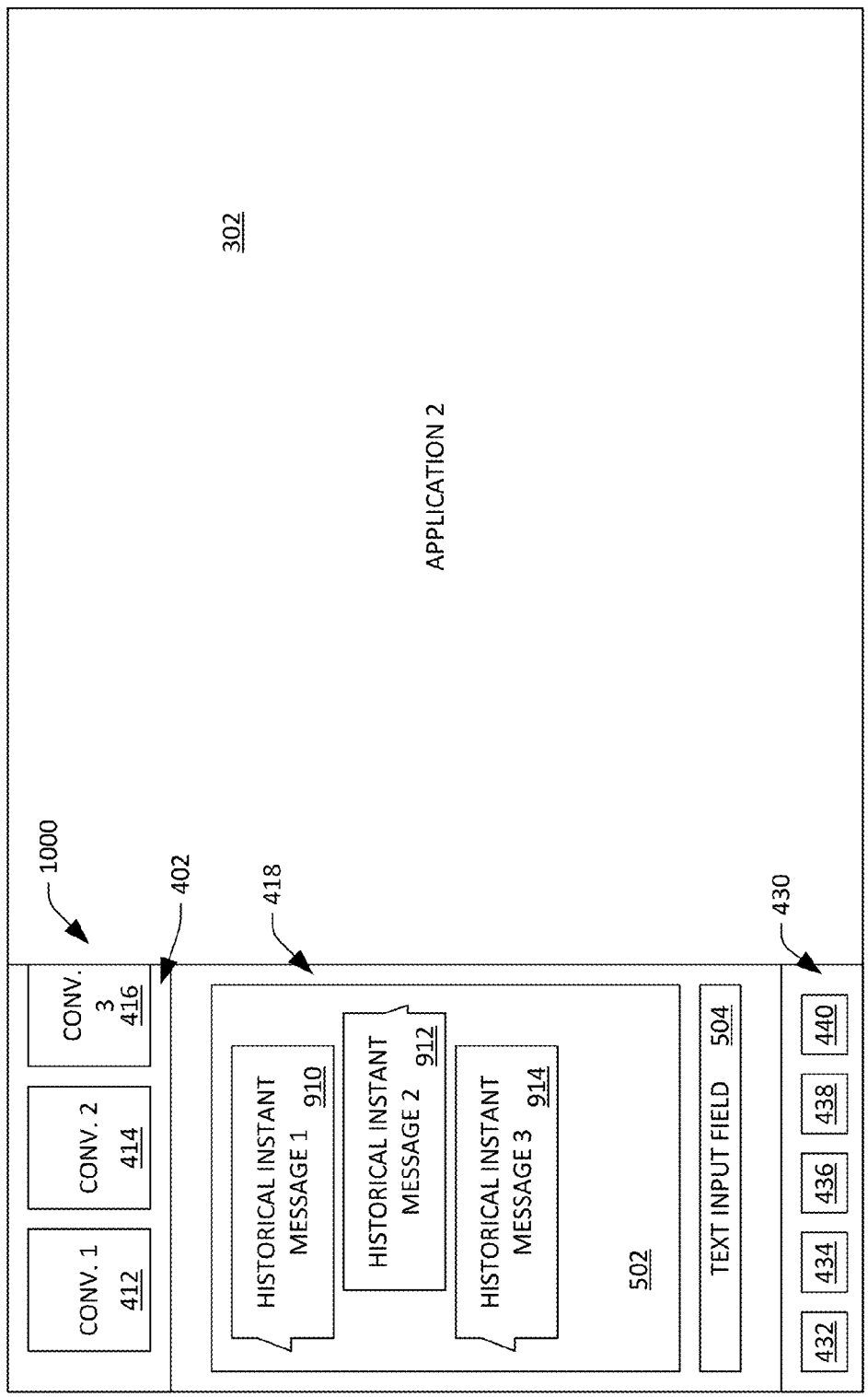
FIG. 10 is an exemplary graphical user interface of the unified communications application that corresponds to the graphical user interface of FIG. 9 when displayed in a condensed view.

Referring now to FIG. 10, an exemplary graphical user interface 1000 of the unified communications application 106 in the condensed view is illustrated. The graphical user interface 1000 illustrates the condensed view that corresponds to the full view shown in FIG. 9. In such condensed view, the instant message region 502 comprises the historical instant messages 910-914. The user of the unified communications application 106 can ascertain the transmitter of a historic instant message by reviewing content of the respective instant message, which includes an identifier of the transmitter. The conversation region 418 does not include conversation participant identifiers due to lack of display screen real estate available when the unified communications application 106 is in the condensed view. Further, as noted above with respect to FIG. 6, if the user indicates a desire to set forth text in the text input field 504, the soft keyboard 602 can be presented on the display screen 104 to the user.

Figure 11:
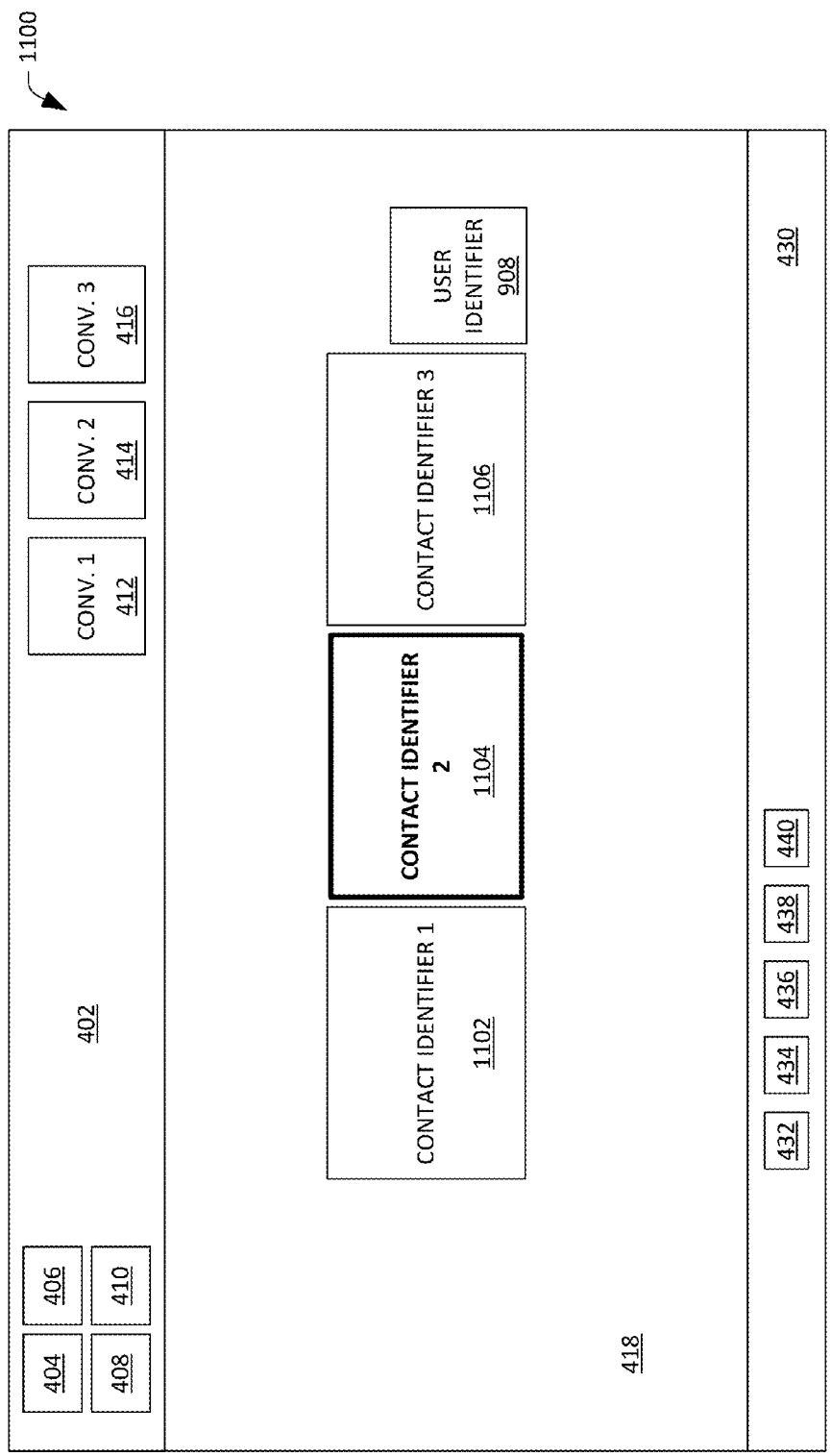
FIG. 11 is an exemplary graphical user interface of the unified communications application displayed in the full view when employed in connection with an audio conference.

With reference to FIG. 11, an exemplary graphical user interface 1100 of the unified communications application 106 in a full view is illustrated. In the graphical user interface 1108, an audio conference is being undertaken, wherein the audio conference includes the user of the unified communications application 106. The graphical user interface 1100 comprises a first contact identifier 1102, a second contact identifier 1104, a third contact identifier 1106, and the user identifier 908. The contact identifiers 1102-1106 represent respective participants in the audio conference. In the exemplary graphical user interface 1100, the conference includes four participants: three contacts of the user of the unified communications application 106 (represented by the contact identifiers 1102-1106) and the user of the unified communications application 106.

Each participant in the audio conversation can be represented by a respective contact identifier. To inform the user of the unified communications application 106 of the dominant speaker, a contact identifier for the dominant speaker can be highlighted in some manner. For example, the contact identifier of the dominant speaker can be enlarged relative to contact identifiers of other participants in the audio conversation. In another exemplary embodiment, the contact identifier of the dominant participant (the participant currently speaking) can be rendered in bold, can have a color placed around the respective contact identifier, etc. While the graphical user interface 1100 depicts an audio conference including four participants, it is to be understood that an audio conversation may include as few as two participants or more participants than four. If the audio conversation includes two participants, then a single contact identifier will be placed in the conversation region 418.

Figure 12:
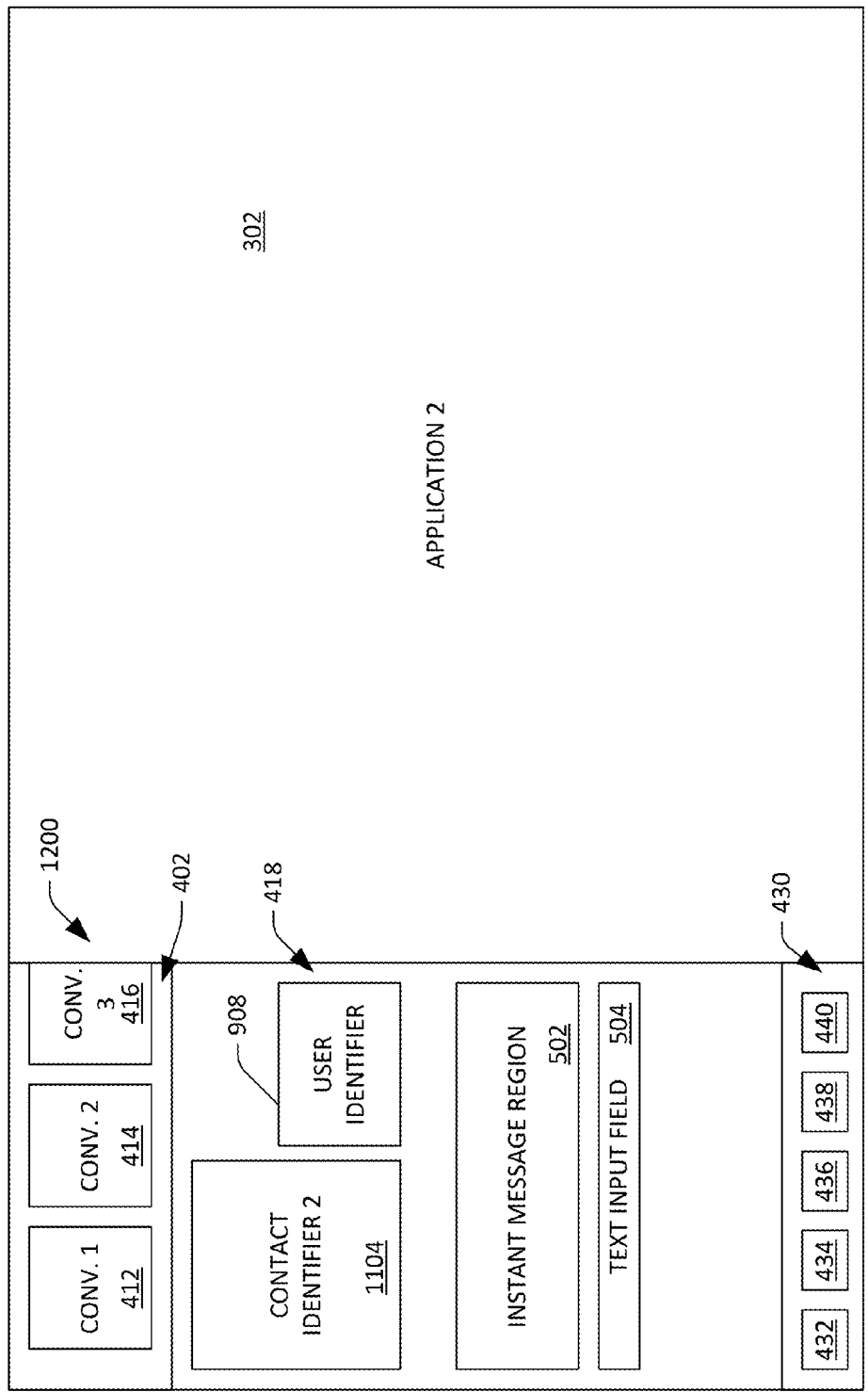
FIG. 12 is an exemplary graphical user interface of the unified communications application that corresponds to the graphical user interface of FIG. 11 in a condensed view.

With reference now to FIG. 12, an exemplary graphical user interface 1200 of the unified communications application 106 in the condensed view is illustrated. The graphical user interface 1200 can be presented when the user of the unified communications application 106 is participating in an audio conversation with at least one other individual. The graphical user interface 1200 is shown as including a single contact identifier; in this case, the second contact identifier 1104. The conversation region 418 further includes the user identifier 908. The contact identifier 1104 is shown when the contact identified thereby is the dominant speaker in the audio conference. If another participant in the conference (other than the user of the unified communications application 106) becomes the dominant speaker, then the contact identifier shown in the conversation region 418 will change. The graphical user interface 1200 is presented herein to illustrate that the user of the unified communications application 106 can participate in an audio conversation while the unified communications application is displayed in the condensed view.

Figure 13:
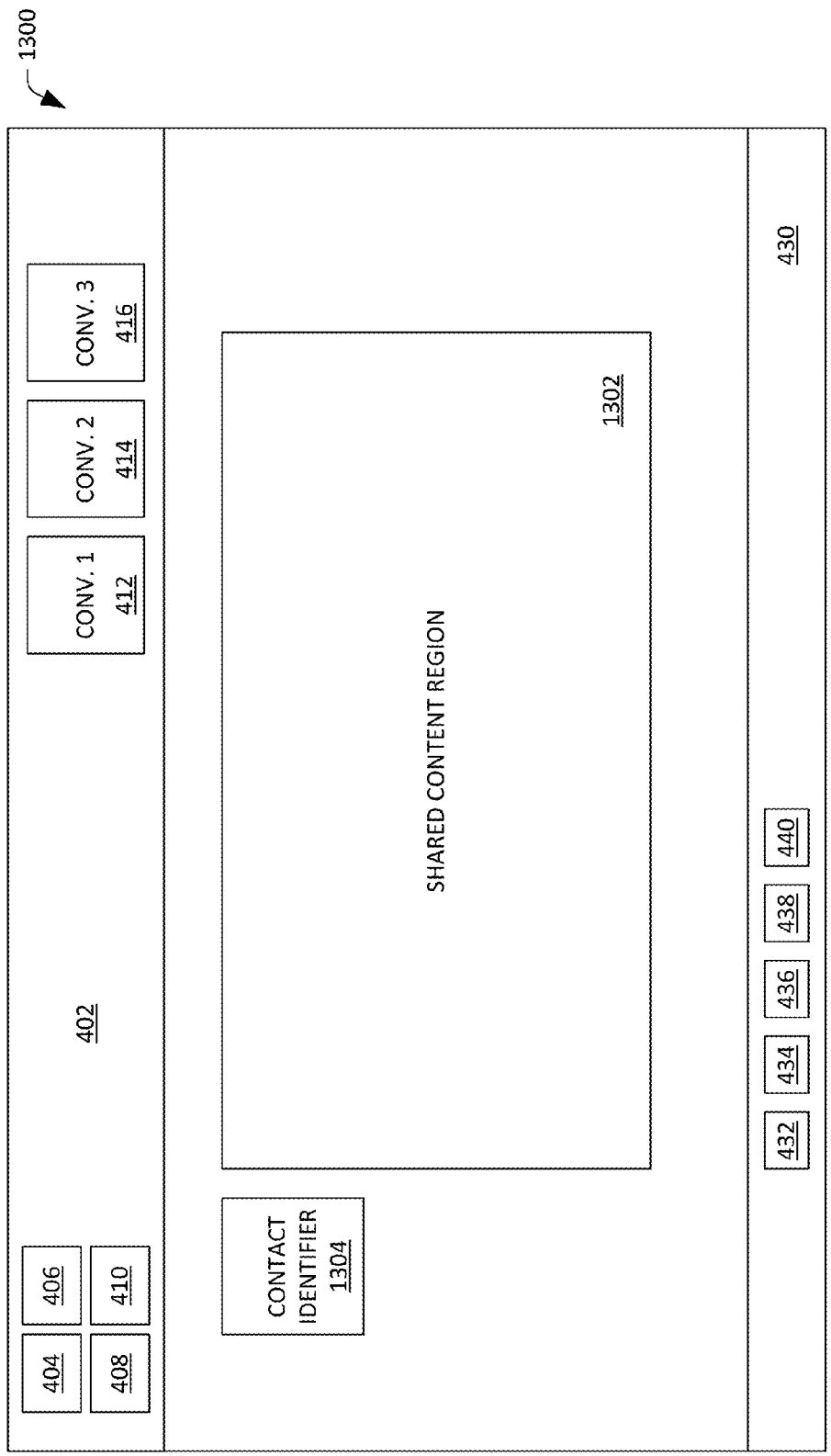
FIG. 13 is an exemplary graphical user interface of the unified communications application displayed in the full view when employed in connection with content sharing.

Referring now to FIG. 13, an exemplary graphical user interface 1300 of the unified communications application 106 in a full view is illustrated. The graphical user interface 1300 depicts a conversation where content is shared amongst participants. In the exemplary graphical user interface 1300, the conversation region 418 comprises a shared content region 1302 which depicts content shared between participants in a conversation. For instance, content shared in the shared content region 1302 may be a word processing document, a desktop of a computer of a participant in the conversation, a slideshow presentation, or other suitable graphical content that is desirably shared during the conversation. The conversation region 418 further comprises a contact identifier 1304 that identifies the contact of the user of the unified communications application 106 that is sharing the content.

Figure 14:
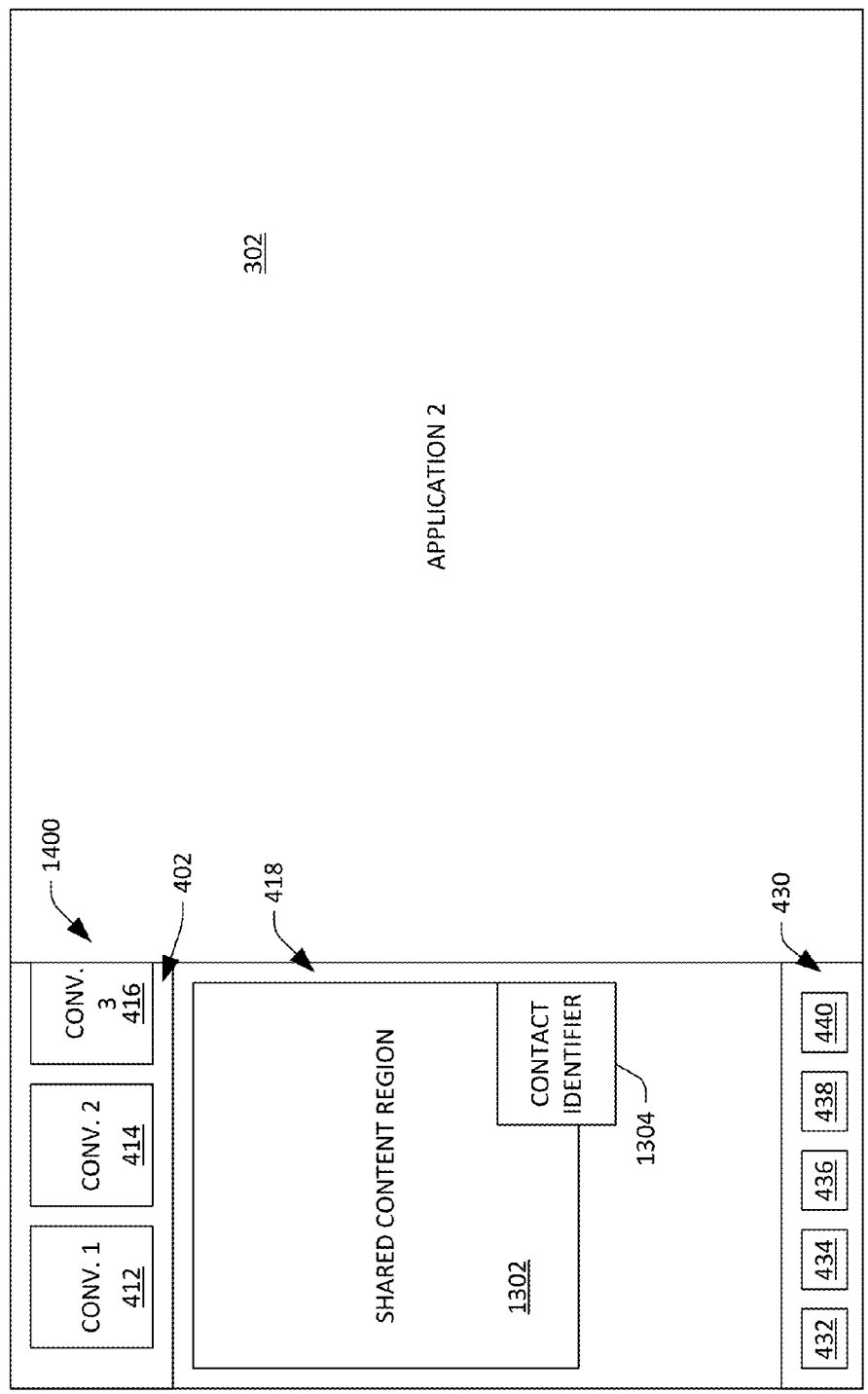
FIG. 14 is an exemplary graphical user interface of the unified communications application that corresponds to the graphical user interface of FIG. 13 when displayed in a condensed view.

With reference now to FIG. 14, another exemplary graphical user interface 1400 of the unified communications application 106 in a condensed view is illustrated. The graphical user interface 1400 can be presented when the user of the unified communications application 106 is participating in a conversation where content is shared. The conversation region 418 of the graphical user interface 1400 includes the shared content region 1302, which displays content shared by a contact of the user of the unified communications application 106 with such user. The conversation region 418 also includes the contact identifier 1304, which in this exemplary embodiment is placed partially over the shared content region 1302. While not shown, the conversation region 418 can also optionally include the instant message region 502 and the text input field 504.

While FIGS. 3-14 have been set forth as depicting several exemplary graphical user interfaces corresponding to the unified communications application in full and condensed views, it is to be understood that features shown and described with respect to such graphical user interfaces may be combined, positioned, or removed in manners not explicitly shown in such figures. For example, in exemplary embodiments, graphical user interfaces 400, 700, and 1100 can be modified to support other communications modalities. In another exemplary embodiment, with respect to graphical user interfaces 400, 700, 900, and 1100, a user may transition between such graphical user interfaces through gesture, voice command, or the like, such that the user can utilize multiple communications modalities in a single conversation when viewing the unified communications application 106 in a full view. Moreover, one or more of the graphical user interfaces described herein may include tiles that identify contacts participating in a conversation but not through a certain communications modality. For example, with respect to the graphical user interface 400, other participants in the exemplary conversation shown therein can be identified by way of (smaller) tiles that may be displayed in the conversation region 418 (e.g., below the first multimedia region 420 and the second multimedia region 422).

Figure 15:
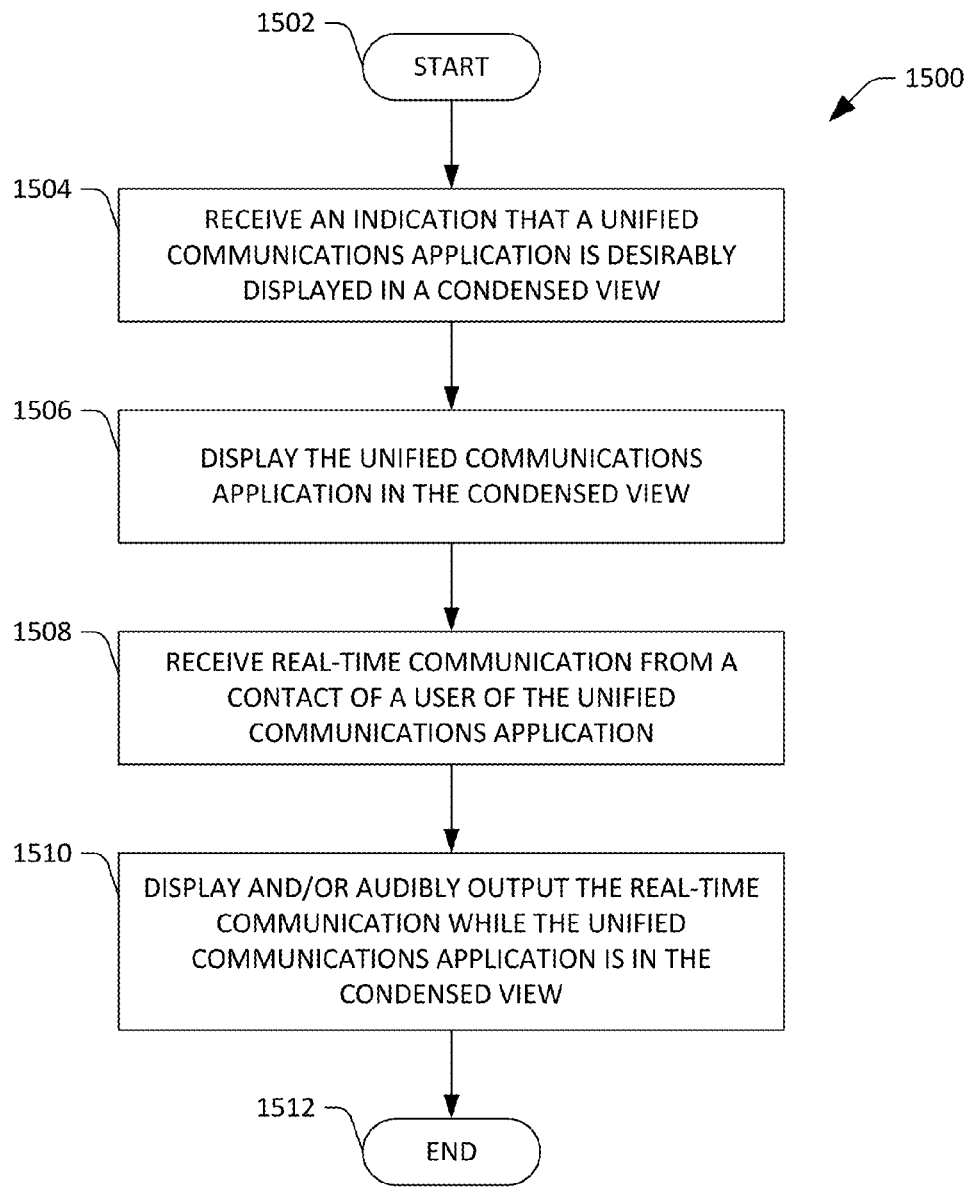
FIG. 15 is a flow diagram that illustrates an exemplary methodology for displaying and/or audibly outputting real-time communications by a unified communications application when such application is displayed on a display screen in a condensed view.
Figure 16:
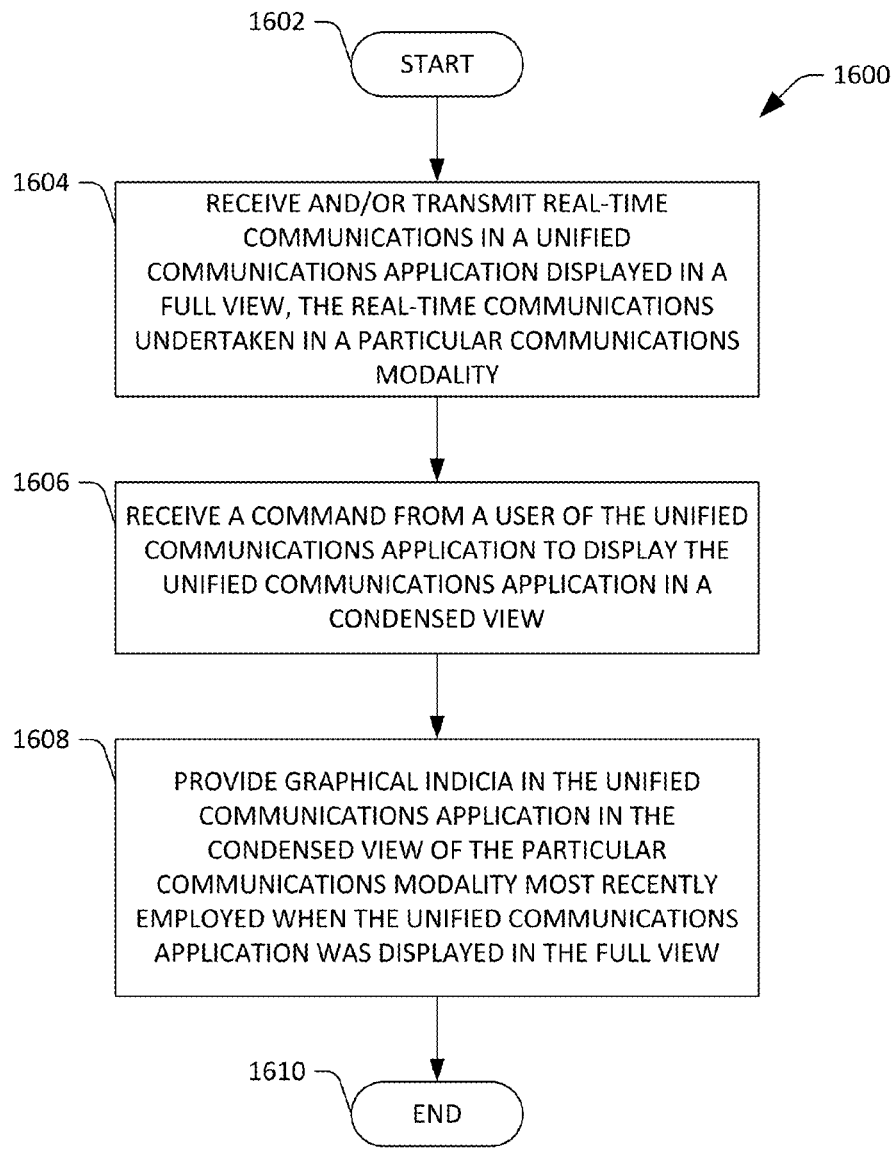
FIG. 16 is a flow diagram that illustrates an exemplary methodology for preserving context with respect to use of a unified communications application as such application transitions from a full few to a condensed view and vice versa.

With reference now to FIGS. 15-16, various exemplary methodologies are illustrated and described. While the methodologies are described as being a series of acts that are performed in a sequence, it is to be understood that the methodologies are not limited by the order of the sequence. For instance, some acts may occur in a different order than what is described herein. In addition, an act may occur concurrently with another act. Furthermore, in some instances, not all acts may be required to implement a methodology described herein.

Moreover, the acts described herein may be computer-executable instructions that can be implemented by one or more processors and/or stored on a computer-readable medium or media. The computer-executable instructions may include a routine, a sub-routine, programs, a thread of execution, and/or the like. Still further, results of acts of the methodologies may be stored in a computer-readable medium, displayed on a display device, and/or the like. The computer-readable medium may be any suitable computer-readable storage device, such as memory, hard drive, CD, DVD, flash drive, or the like. As used herein, the term "computer-readable medium" is not intended to encompass a propagated signal.

Now referring to FIG. 15, an exemplary methodology 1500 that facilitates undertaking real-time communications using a unified communications application when the unified communications application is in a condensed view is illustrated. The methodology 1500 starts at 1502, and at 1504 an indication is received that a unified communications application executing on a computing device is desirably displayed on a display screen of the computing device in a condensed view. As noted above, the unified communications application is displayable on the display screen in one of the condensed view or a full view, wherein the condensed view occupies a first portion of the display screen when the unified communications application is shown in such view, and wherein the unified communications application occupies a second portion of display screen that is larger than the first portion when displayed in the full view. At 1506, a unified communications application is displayed in the condensed view on the display screen of the computing device.

At 1508, a real-time communication is received from a contact of the user of the unified communications application. Such real-time communication can be, for example, any one of an instant message, a video conversation, content being shared by the contact of the user with the user, or the like.

At 1510, the real-time communication received at 1508 is displayed and/or audibly output while the unified communications application is in the condensed view. Additionally, the unified communications application can receive real-time communication input from the user thereof, and can transmit such real-time communication input to other devices while the unified communications application is displayed in the condensed view. The methodology 1500 completes at 1512.

With reference now to FIG. 16, an exemplary methodology 1600 that facilitates preserving context in a unified communications application when transitioning between a condensed view and a full view is illustrated. The methodology 1600 starts at 1602, and at 1604 real-time communications in a unified communications application are received and/or transmitted and are displayed in a full view. As noted above, the full view occupies a majority of a display screen of the computing device. Additionally, the real-time communications received and/or transmitted correspond to a particular communications modality, such as instant messaging, audio conferencing, etc.

At 1606, a command from a user of the unified communications application is received to display the unified communications application in a condensed view. At 1608, graphical indicia is provided in the unified communications application in the condensed view to indicate the particular communications modality of the real-time communications employed when the unified communications application was displayed in the full view; thus, context of the interaction of the user with unified communications application when transitioning between the full view and the condensed view is preserved and set forth to the user. The methodology 1600 completes at 1610.

Figure 17:
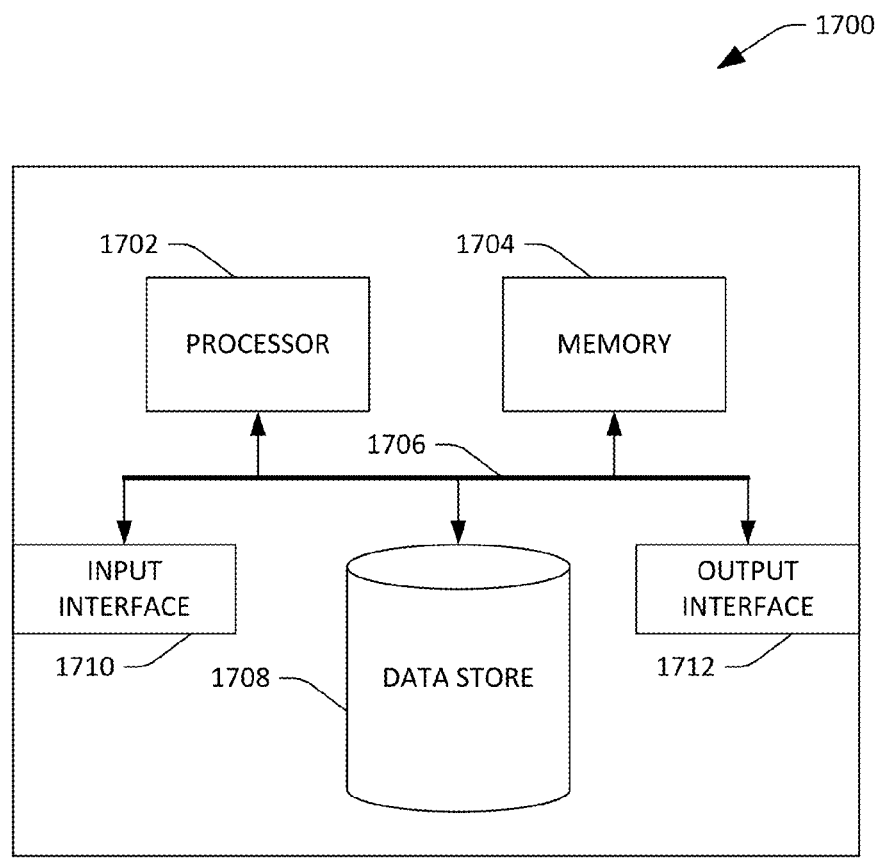
FIG. 17 is an exemplary computing system.

Now referring to FIG. 17, a high-level illustration of an exemplary computing device 1700 that can be used in accordance with the systems and methodologies disclosed herein is illustrated. The computing device 1700 may be any suitable computing device, including but not limited to a desktop computing device, a laptop computing device, a tablet computing device, a mobile telephone, a mobile media player, a personal digital assistance, etc. The computing device 1700 may be used in a system that supports real-time communications. In another example, at least a portion of the computing device 1700 may be used in a system that supports display of applications in full views and condensed views. The computing device 1700 includes at least one processor 1702 that executes instructions that are stored in a memory 1704. The memory 1704 may be or include RAM, ROM, EEPROM, Flash memory, or other suitable memory. The instructions may be, for instance, instructions for implementing functionality described as being carried out by one or more components discussed above or instructions for implementing one or more of the methods described above. The processor 1702 may access the memory 1704 by way of a system bus 1706. In addition to storing executable instructions, the memory 1704 may also store historic instant messages, voice mails, contact data, etc.

The computing device 1700 additionally includes a data store 1708 that is accessible by the processor 1702 by way of the system bus 1706. The data store 1708 may be or include any suitable computer-readable storage, including a hard disk, memory, etc. The data store 1208 may include executable instructions, contact data, voice mails, historic instant messages, etc. The computing device 1700 also includes an input interface 1710 that allows external devices to communicate with the computing device 1700. For instance, the input interface 1710 may be used to receive instructions from an external computer device, a user, etc. The computing device 1700 also includes an output interface 1712 that interfaces the computing device 1700 with one or more external devices. For example, the computing device 1700 may display text, images, etc. by way of the output interface 1712.

Additionally, while illustrated as a single system, it is to be understood that the computing device 1700 may be a distributed system. Thus, for instance, several devices may be in communication by way of a network connection and may collectively perform tasks described as being performed by the computing device 1700.

It is noted that several examples have been provided for purposes of explanation. These examples are not to be construed as limiting the hereto-appended claims. Additionally, it may be recognized that the examples provided herein may be permutated while still falling under the scope of the claims.

What is claimed is:

1. A method, comprising:
   receiving an indication that a unified communications application executing on a computing device is to be displayed on a display of the computing device in a condensed view, the unified communications application displayable on the display in either a condensed view or a full view, the condensed view occupying a first portion of the display when displayed, the full view occupying a second portion of the display when displayed, the second portion is larger than the first portion, the unified communications application supports multiple communications modalities, the communications modalities comprising real-time communications modalities and non real-time communications modalities, the real-time communications modalities comprising instant messaging, video conferencing, and content sharing, the non real-time communications modalities comprising voicemail playback; and
   displaying, on the display of the computing device, the unified communications application in the condensed view responsive to receiving the indication, the unified communications application in the condensed view configured to receive and display real-time communications from at least one contact of a user of the computing device in any of the communications modalities.

2. The method of claim 1, further comprising:
   when the unified communications application is in the condensed view, displaying a conversation region on the display, wherein the conversation region comprises real-time communications in at least two communications modalities in the multiple communications modalities.

3. The method of claim 1, wherein the unified communications application in the condensed view comprises a conversation region, the conversation region comprises a multimedia region that depicts one of video or content being shared with a user of the computing device.

4. The method of claim 3, wherein the conversation region comprises an instant message region, the instant message region depicting instant messages previously transmitted to the user of the computing device or from the user of the computing device.

5. The method of claim 4, wherein the instant message region further comprises a text entry field that is configured to receive input from the user of the computing device.

6. The method of claim 5, further comprising:
   receiving an indication from the user that the user is to input text into the text entry field; and
   responsive to receiving the indication, displaying a software keyboard on the display of the computing device, wherein displaying the software keyboard comprises reducing size of the unified communications application in the condensed view and displaying the software keyboard in at least a portion of the display previously occupied by the unified communications application in the condensed view.

7. The method of claim 1, wherein the unified communications application in the condensed view comprises an application bar, the application bar comprising a plurality of selectable graphical tiles that facilitate controlling real-time communications undertaken by way of the unified communications application.

8. The method of claim 7, wherein the plurality of selectable graphical tiles comprise:
   a first button that controls at least one instant messaging feature;
   a second button that controls at least one audio feature;
   a third button controls at least one telecommunication feature;
   a fourth button that controls at least one video feature; and
   a fifth button that controls at least one content sharing feature.

9. The method of claim 1, further comprising:
   receiving a notification when the unified communications application is in the condensed view, the notification requesting user input; and
   displaying, on the display, the notification in the unified communications application in the condensed view, the notification comprising at least one selectable graphical button configured to receive the user input.

10. The method of claim 1 executed on a mobile computing device.

11. The method of claim 1, further comprising displaying, n the display, graphical data in the unified communications application in the condensed view to visually indicate to a user of the computing device a functionality of the unified communications application most recently employed by the user of the computing device when the unified communications application was displayed in the full view.

12. The method of claim 11, wherein prior to receiving the indication, the unified communications application is displayed on the display of the computing device in the full view, the full view graphically depicting one of the following graphical features related to the functionality of the unified communications application:
   a plurality of contacts of a user of the computing device;
   a history of instant messaging communications between the user of the computing device and at least one contact thereof; or
   received voice mail from at least one contact of the user of the computing device, the method further comprising:
   in response to receiving the indication, displaying, on thee display, the graphical data in the unified communications application in the condensed view to visually indicate to the user of the computing device a most recently viewed graphical feature of the graphical features.

13. A system comprising:
   at least one processor; and memory that comprises instructions that, when executed by the at least one processor, cause the at least one processor to perform acts comprising:

receiving an indication from a user of a computing device that a unified communications application executing on the computing device is to be displayed in a condensed view, the unified communications application displayable in either the condensed view or a full view, the unified communications application being a windowless application, the unified communications application is configured to transmit and receive real-time communications in a plurality of different real-time modalities, the real-time modalities comprising instant messaging, teleconferencing, and content sharing, the unified communications application further configured with at least one non real-time communications modality, the at least one non real-time communications modality comprises voicemail playback; and displaying the unified communications application in the condensed view on a display of the computing device, the unified communications in the condensed view comprising a graphical region that is configured to facilitate real-time communications in any of the real-time modalities.

14. The system of claim 13 comprised by a tablet computing device.

15. The system of claim 13, wherein the unified communications application, when displayed in the condensed view, is displayed on a first portion of the display of the computing device, and wherein the unified communications application, when displayed in the full view, is displayed on a second portion of the display of the computing device, the second portion being larger than the first portion.

16. The system of claim 13, wherein the acts further comprise:

receiving an indication that a contact of a user of the unified communications application desirably shares content with the user; and displaying the content in the unified communications application in the condensed view.

17. The system of claim 16, wherein the content is a computer-executable file that is simultaneously viewed by the user of the unified communications application and the contact of the user.

18. The system of claim 17, wherein the computer-executable file is one of a word processing document, a spreadsheet, or a slide show presentation.

19. The system of claim 13, wherein the acts further comprise:

receiving an indication that a user of the unified communications application is to transmit an instant message to a contact of the user when the display component is displaying the unified communications application in the condensed view; and responsive to receiving such indication, displaying a soft keyboard on the display of the computing device.

20. A Computer-readable memory comprising instructions that, when executed by a processor, cause the processor to perform acts comprising:

responsive to receiving a first command from a user, initiating a unified communications application on a computing device, wherein initiating the unified communications application comprises displaying the unified communications application in a full view on a display of the computing device, the full view consuming more than fifty percent of the display screen, and the unified communications application is configured to transmit and receive real-time communications in a plurality of modalities, the modalities comprising instant messaging, video communications, and content sharing, the unified communications application further configured with at least one non real-time communications modality, the at least one non real-time communications modality comprises voicemail playback;

responsive to receiving a second command from the user, displaying the unified communications application in a condensed view on the display of the computing device, the condensed view consuming less than fifty percent of the display, and a remainder of display real estate not consumed by the unified communications application is consumed by a full view of a second application;

when the unified communications application is displayed in the condensed view, receiving a real-time communication from at least one contact of the user that is to be displayed to the user by way of the unified communications application; and displaying the real-time communication in the condensed view of the unified communications application responsive to the receiving of the real-time communication.

* * * * *